US009403954B2

(12) United States Patent
Ota et al.

(10) Patent No.: US 9,403,954 B2
(45) Date of Patent: Aug. 2, 2016

(54) FLUORORUBBER COMPOSITION AND METHOD FOR PRODUCING SAME

(71) Applicant: DAIKIN INDUSTRIES, LTD., Osaka-shi, Osaka (JP)

(72) Inventors: Daisuke Ota, Settsu (JP); Akinori Ueda, Settsu (JP); Yuu Kadowaki, Settsu (JP); Mayuko Taeda, Settsu (JP); Masanori Kitaichi, Settsu (JP); Michiko Doi, Settsu (JP); Kazuhiro Yamamura, Settsu (JP); Shoji Fukuoka, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/346,156

(22) PCT Filed: Jan. 18, 2013

(86) PCT No.: PCT/JP2013/051513
§ 371 (c)(1),
(2) Date: Mar. 20, 2014

(87) PCT Pub. No.: WO2013/108936
PCT Pub. Date: Jul. 25, 2013

(65) Prior Publication Data
US 2014/0228482 A1 Aug. 14, 2014

Related U.S. Application Data

(60) Provisional application No. 61/589,176, filed on Jan. 20, 2012, provisional application No. 61/603,021, filed on Feb. 24, 2012.

(51) Int. Cl.
*C08K 3/04* (2006.01)
*C08J 3/20* (2006.01)
*B29B 7/18* (2006.01)
*B29B 7/82* (2006.01)

(52) U.S. Cl.
CPC . *C08J 3/203* (2013.01); *B29B 7/18* (2013.01); *B29B 7/82* (2013.01); *C08K 3/04* (2013.01); *C08J 2315/02* (2013.01); *C08J 2327/16* (2013.01)

(58) Field of Classification Search
CPC ........................................................ C08K 3/04
USPC ........................................................ 524/495
See application file for complete search history.

(56) References Cited

U.S. PATENT DOCUMENTS

| 4,158,678 A | 6/1979 | Tatemoto et al. |
| 4,243,770 A | 1/1981 | Tatemoto et al. |
| 4,543,394 A | 9/1985 | Finlay et al. |
| 4,861,836 A | 8/1989 | Tatemoto et al. |
| 4,962,236 A | 10/1990 | Tatemoto et al. |
| 4,988,562 A | 1/1991 | Ryoke et al. |
| 5,198,136 A | 3/1993 | Tatemoto et al. |
| 5,508,355 A | 4/1996 | Toda et al. |
| 6,232,390 B1 | 5/2001 | Ono et al. |
| 6,252,006 B1 | 6/2001 | Tomihashi et al. |
| 6,346,587 B1 | 2/2002 | Kruger et al. |
| 9,006,328 B2 | 4/2015 | Ota et al. |
| 9,045,614 B2 | 6/2015 | Ota et al. |
| 9,068,053 B2 | 6/2015 | Yano et al. |
| 2001/0031815 A1 | 10/2001 | Nakano et al. |
| 2005/0085576 A1 | 4/2005 | Kinoshita et al. |
| 2005/0159557 A1 | 7/2005 | Fukushi et al. |
| 2008/0248225 A1 | 10/2008 | Bandyopadhyay |
| 2008/0306196 A1 | 12/2008 | Irie et al. |
| 2009/0263603 A1 | 10/2009 | Ota et al. |
| 2010/0004415 A1 | 1/2010 | Maeda et al. |
| 2010/0051259 A1 | 3/2010 | Pessin et al. |
| 2010/0216933 A1 | 8/2010 | Wang |
| 2011/0200777 A1 | 8/2011 | Doi et al. |
| 2011/0269911 A1 | 11/2011 | Morita et al. |
| 2011/0277918 A1 | 11/2011 | Lee et al. |
| 2012/0067706 A1 | 3/2012 | Terada et al. |

(Continued)

FOREIGN PATENT DOCUMENTS

| CN | 1989202 A | 6/2007 |
| DE | 19812755 A1 | 9/1999 |

(Continued)

OTHER PUBLICATIONS

International Search Report and Written Opinion of the International Searching Authority dated Mar. 19, 2013 for PCT/JP2013/051512.
International Search Report and Written Opinion of the International Searching Authority dated Mar. 19, 2013 for PCT/JP2013/051513.
International Search Report and Written Opinion of the International Searching Authority dated Jun. 4, 2013 for PCT/JP2013/055603.
International Search Report and Written Opinion of the International Searching Authority dated Jun. 4, 2013 for PCT/JP2013/055611.
International Search Report and Written Opinion of the International Searching Authority dated May 14, 2013 for PCT/JP2013/055612.
U.S. Appl. No. 14/380,133, filed Aug. 21, 2014, Ota et al.
U.S. Appl. No. 14/380,101, filed Aug. 21, 2014, Ota et al.
U.S. Appl. No. 14/361,807, filed May 30, 2014, Ota et al.
Communication dated Mar. 3, 2015 from the European Patent Office in application No. 13738608.2.
Communication dated Mar. 6, 2015 from the European Patent Office in application No. 13739075.3.
Communication dated Jul. 21, 2015 from the European Patent Office in counterpart application No. 13752402.1.

(Continued)

*Primary Examiner* — Edward Cain
(74) *Attorney, Agent, or Firm* — Sughrue Mion, PLLC

(57) ABSTRACT

The invention provides a fluororubber composition able to produce a crosslinked fluororubber article that exhibits not only heat resistance, but also excellent mechanical properties at high temperatures, and a method for producing same. The fluororubber composition contains: a fluororubber (A); and carbon black (B), wherein when the aforementioned fluororubber composition is immersed for 160 hours in an extraction solvent of acetone and hexane at an acetone:hexane mass ratio of 42.29:57.71 at 40° C. and an extraction residue that is not extracted and remains as a solid is separated from the aforementioned extraction solvent and dried and then the dry weight of the extraction residue is measured, the quantity of a solvent-insoluble polymer is not lower than 5%.

13 Claims, 2 Drawing Sheets

(56) References Cited

U.S. PATENT DOCUMENTS

| | | |
|---|---|---|
| 2012/0077924 A1 | 3/2012 | Ota et al. |
| 2012/0077926 A1 | 3/2012 | Ota et al. |
| 2012/0077927 A1 | 3/2012 | Ota et al. |
| 2012/0077938 A1 | 3/2012 | Terada et al. |
| 2012/0077939 A1 | 3/2012 | Ota et al. |
| 2012/0095150 A1 | 4/2012 | Ota et al. |
| 2012/0095151 A1 | 4/2012 | Terada et al. |
| 2012/0259054 A1* | 10/2012 | Okutsu ............... 524/495 |
| 2014/0288226 A1† | 9/2014 | Ota |
| 2015/0017364 A1 | 1/2015 | Ota et al. |
| 2015/0031822 A1 | 1/2015 | Ota et al. |
| 2015/0133592 A1 | 5/2015 | Miyasaka et al. |
| 2015/0330537 A1 | 11/2015 | Ota |

FOREIGN PATENT DOCUMENTS

| | | | |
|---|---|---|---|
| EP | 0683149 A2 | | 11/1995 |
| EP | 2258767 A1 | | 12/2010 |
| JP | 53-3495 | | 1/1978 |
| JP | 53-125491 | | 11/1978 |
| JP | 60-55050 A | | 3/1985 |
| JP | 63-159336 A | | 7/1988 |
| JP | 1-106330 A | | 4/1989 |
| JP | 1-153745 A | | 6/1989 |
| JP | 2-124913 A | | 5/1990 |
| JP | 2-308841 A | | 12/1990 |
| JP | 3-122153 A | | 5/1991 |
| JP | 4-359946 A | | 12/1992 |
| JP | 6-25500 A | | 2/1994 |
| JP | 07-011087 | † | 1/1995 |
| JP | 7-11087 A | | 1/1995 |
| JP | 07-134469 | † | 5/1995 |
| JP | 7-134469 A | | 5/1995 |
| JP | 07-196881 | † | 8/1995 |
| JP | 7-196881 A | | 8/1995 |
| JP | 8-3017 B2 | | 1/1996 |
| JP | 10-219062 A | | 8/1998 |
| JP | 11-193332 A | | 7/1999 |
| JP | 11-344165 A | | 12/1999 |
| JP | 2001-114964 A | | 4/2001 |
| JP | 2001-261846 | † | 9/2001 |
| JP | 2001-261846 A | | 9/2001 |
| JP | 2002-192528 A | | 7/2002 |
| JP | 2003-13041 A | | 1/2003 |
| JP | 2004-26897 A | | 1/2004 |
| JP | 2004-123878 A | | 4/2004 |
| JP | 2005-113017 A | | 4/2005 |
| JP | 2006-70132 A | | 3/2006 |
| JP | 2006-513304 A | | 4/2006 |
| JP | 2007-137941 A | | 6/2007 |
| JP | 2008-184496 A | | 8/2008 |
| JP | 2009-224048 A | | 10/2009 |
| JP | 2009-227780 A | | 10/2009 |
| JP | 2009-256455 A | | 11/2009 |
| JP | 2010-24339 A | | 2/2010 |
| JP | 2010-285526 | † | 12/2010 |
| JP | 2010-285526 A | | 12/2010 |
| JP | 2011-148902 A | | 8/2011 |
| JP | 2011-522921 A | | 8/2011 |
| JP | 2012-519221 A | | 8/2012 |
| JP | 2013-14640 A | | 1/2013 |
| JP | 2013-173929 A | | 9/2013 |
| JP | 2013-173930 A | | 9/2013 |
| JP | 2013-175462 A | | 9/2013 |
| WO | 95/15359 A1 | | 6/1995 |
| WO | 98/07784 A1 | | 2/1998 |
| WO | 03/076535 A1 | | 9/2003 |
| WO | 2004/067618 A1 | | 8/2004 |
| WO | 2007/135937 A1 | | 11/2007 |
| WO | 2007/148759 A1 | | 12/2007 |
| WO | 2010007699 A1 | | 1/2010 |
| WO | 2010/101304 A1 | | 9/2010 |
| WO | 2012/026006 A1 | | 3/2012 |
| WO | 2012/026007 A1 | | 3/2012 |
| WO | 2012/026534 A1 | | 3/2012 |
| WO | 2012/026552 A1 | | 3/2012 |
| WO | 2012/026553 A1 | | 3/2012 |
| WO | 2012/026554 A1 | | 3/2012 |
| WO | 2012/026555 A1 | | 3/2012 |
| WO | 2012/026556 A1 | | 3/2012 |
| WO | 2012/026558 A1 | | 3/2012 |
| WO | 2012/026559 A1 | | 3/2012 |
| WO | 2013/108935 A1 | | 7/2013 |
| WO | 2013/108936 A1 | | 7/2013 |
| WO | 2013/125731 A1 | | 8/2013 |
| WO | 2013/125735 A1 | | 8/2013 |
| WO | 2013/125736 A1 | | 8/2013 |

OTHER PUBLICATIONS

Communication dated Jul. 21, 2015 from the European Patent Office in counterpart application No. 13751700.9.
Communication dated Oct. 7, 2015 from the United States Patent and Trademark Office in counterpart U.S. Appl. No. 14/380,197.
"Physical & Chemical Properties", Anonymous, Jan. 20, 2006, XP55248779, 7 pages total.
Office Action of related Patent Application No. JP 2014-506387 published Dec. 8, 2014.†
English translation of Office Action for related Patent Application No. JP 2014-506387.†

\* cited by examiner
† cited by third party (a)

(b)

(c)

FLUORORUBBER COMPOSITION AND METHOD FOR PRODUCING SAME

CROSS-REFERENCE TO RELATED APPLICATIONS

This application is a National Stage of International Application No. PCT/JP2013/051513, filed on Jan. 18, 2013, which claims benefit under 35 U.S.C. §119(e) of U.S. Provisional Application No. 61/589,176, filed on Jan. 20, 2012 and U.S. Provisional Application No. 61/603,021, filed on Feb. 24, 2012, the contents of all of which are incorporated herein by reference in their entirety.

TECHNICAL FIELD

The present invention relates to a fluororubber composition and a method for producing same.

BACKGROUND ART

Fluororubbers are known to exhibit excellent chemical resistance, oil resistance, heat resistance, cold resistance and the like.

Patent Literature 1 proposes a bromine-containing fluororubber composition having improved compression set resistance even after being heated to a high temperature.

Patent Literature 2 proposes a vulcanized fluororubber composition which achieves an extremely high tensile strength and which gives a crosslinked article having similarly excellent compression set resistance, heat resistance, oil resistance and chemical resistance to a conventional vulcanized fluororubber.

Patent Literature 3 proposes a fluorine-containing elastomer which can give a vulcanized product having excellent elongation during breaking at a high temperature such as 100° C. and excellent compression set characteristics at a low temperature such as 0° C.

As a composition having excellent high-temperature strength, Patent Literature 4 proposes a fluororubber composition obtained by incorporating 5 to 100 parts by weight of a fluorine-containing thermoplastic elastomer in 100 parts by weight of a fluororesin (b).

CITATION LIST

Patent Literature

[Patent Literature 1] Japanese Patent Application Publication No. S60-55050
[Patent Literature 2] Japanese Patent Application Publication No. H3-122153
[Patent Literature 3] Japanese Patent Application Publication No. 2008-184496
[Patent Literature 4] Japanese Patent Application Publication No. H06-25500

SUMMARY OF INVENTION

Technical Problem

An objective of the present invention is to provide a fluororubber composition able to give a crosslinked fluororubber article that exhibits not only heat resistance, but also excellent mechanical properties at high temperatures, and a method for producing same.

Solution to Problem

As a result of diligently investigating fluororubber compositions able to give fluororubber compositions having excellent mechanical properties, the inventors of the present invention found that by using a certain specific production method, it was possible to produce a novel fluororubber composition in which the quantity of a solvent-insoluble polymer is not lower than 5% and also possible to obtain a crosslinked fluororubber article having excellent mechanical properties from this fluororubber composition, and thereby completed the present invention.

Specifically, the present invention is a fluororubber composition including: a fluororubber (A); and carbon black (B), wherein when the fluororubber composition is immersed for 160 hours in an extraction solvent of acetone and hexane at an acetone:hexane mass ratio of 42.29:57.71 at 40° C. and an extraction residue that is not extracted and remains as a solid is separated from the extraction solvent and dried, and then the dry weight of the extraction residue is measured, the quantity of a solvent-insoluble polymer, as calculated using the expression below, is not lower than 5%.

Quantity of solvent-insoluble polymer (%) = [Expression 1]

$$\frac{w' \times \Phi'_p}{w \times \Phi_p} \times 100$$

(where, w is an initial weight (g) of the fluororubber composition which is immersed in the extraction solvent, w' is a dry weight (g) of the extraction residue, $\Phi_p$ is an initial weight fraction of the fluororubber (A) contained in the fluororubber composition which is immersed in the extraction solvent relative to the fluororubber composition, and $\Phi_p'$ is a weight fraction of the fluororubber (A) contained in the extraction residue relative to the extraction residue.)

The fluororubber (A) is preferably a vinylidene fluoride-based rubber.

The fluororubber (A) is preferably a bipolymer selected from among the group consisting of a copolymer of vinylidene fluoride and hexafluoropropylene, a copolymer of vinylidene fluoride and a fluorine-containing monomer represented by general formula (2) and a copolymer of vinylidene fluoride and a perfluoro(alkyl vinyl ether):

Here, general formula (2) being $$CH_2=CFR_f \quad (2)$$

(where, $R_f$ is a straight chain or branched chain fluoroalkyl group having 1 to 12 carbon atoms).

It is preferable to incorporate 5 to 65 parts by mass of the carbon black (B) relative to 100 parts by mass of the fluororubber (A).

It is preferable for the carbon black (B) to have a nitrogen adsorption specific surface area ($N_2SA$) of 25 to 180 m²/g and a dibutyl phthalate (DBP) absorption number of 45 to 180 ml/100 g.

It is preferable for the fluororubber composition of the present invention to further contain a crosslinking agent (C) and/or a crosslinking accelerator (D).

The present invention is also a method for producing a fluororubber composition, this method including: a step (1-1) of mixing the fluororubber (A) and the carbon black (B) by means of an internal mixer until the maximum temperature reaches 80 to 220° C. so as to obtain an intermediate composition; a step (1-2) of cooling the intermediate composition to a temperature of lower than 50° C.; and a step (2-1) of mixing the cooled intermediate composition until the maximum temperature reaches not lower than 10° C. but lower than 80° C. so as to obtain a fluororubber composition.

It is preferable to mix 5 to 65 parts by mass of the carbon black (B) with 100 parts by mass of the fluororubber (A) in the step (1-1).

It is preferable to further mix the crosslinking agent (C) and/or the crosslinking accelerator (D) in the step (1-1).

It is preferable for the present invention to further include a step of mixing the crosslinking agent (C) and/or the crosslinking accelerator (D) with the fluororubber composition obtained in step (2-1).

Advantageous Effects of Invention

By having the constitution mentioned above, the fluororubber composition of the present invention can give a crosslinked fluororubber article that exhibits not only heat resistance, but also excellent mechanical properties at high temperatures. In addition, according to the method for producing a fluororubber composition of the present invention, it is possible to produce a fluororubber composition able to give a crosslinked article that exhibits not only heat resistance, but also excellent mechanical properties at high temperatures.

DESCRIPTION OF EMBODIMENTS

Figure 1:
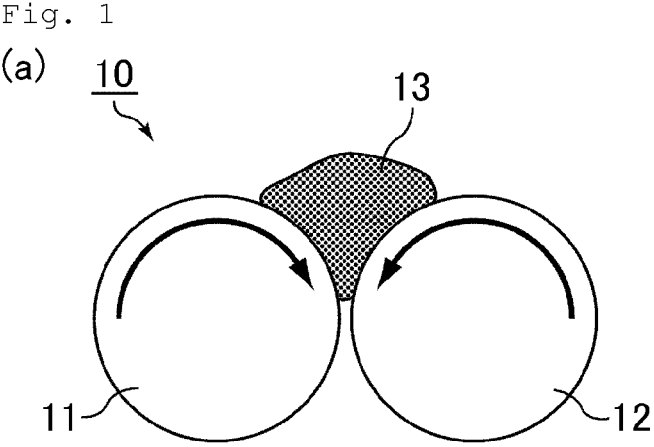
FIG. 1 is a diagram showing a schematic view of the mixing method used in step (2-1) and step (2-2).
Figure 1:
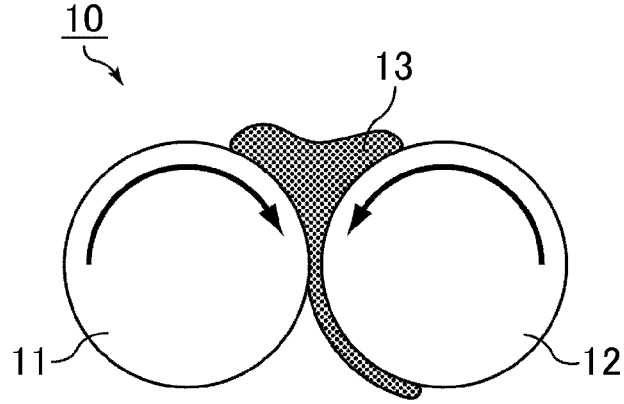
Figure 1:
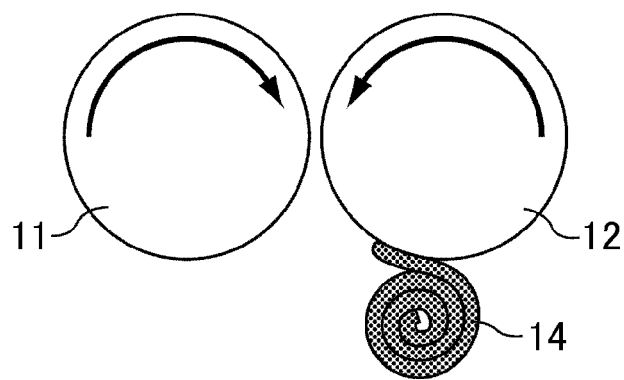

The fluororubber composition of the present invention is characterized by comprising a fluororubber (A) and carbon black (B) and in that the quantity of a solvent-insoluble polymer is not lower than 5%. The above-mentioned quantity of solvent-insoluble polymer is more preferably not lower than 40%, and further preferably not lower than 48%. The upper limit thereof is not particularly limited, but may be 95%. If the quantity of a solvent-insoluble polymer that remains due to not being extracted from a fluororubber composition comprising a fluororubber (A) and carbon black (B) is high, it is thought that the rubber structure will be further strengthened and it is possible to obtain a crosslinked fluororubber article having excellent mechanical properties.

The above-mentioned quantity of solvent-insoluble polymer can be calculated using the following expression.

Quantity of solvent-insoluble polymer (%) = [Expression 2]
$$\frac{w' \times \Phi'_p}{w \times \Phi_p} \times 100$$

(In the expression, w is the initial weight (g) of the fluororubber composition which is immersed in the extraction solvent, w' is the dry weight (g) of the extraction residue, $\phi_p$ is the initial weight fraction of the fluororubber (A) contained in the fluororubber composition which is immersed in the extraction solvent relative to the fluororubber composition, and $\phi_p'$ is the weight fraction of the fluororubber (A) contained in the extraction residue relative to the extraction residue.)

In the expression above, w' is the dry weight of an extraction residue not extracted by the extraction solvent, and can be measured using the following method. Specifically, a part of the uncrosslinked fluororubber composition is extracted, the weight (w) thereof is measured, and this part is then placed in an extraction solvent and allowed to stand for 160 hours at 40° C. The extraction residue, which is not extracted by the extraction solvent and remains as a solid, is separated from the extraction solvent, sufficiently dried, and the weight (w') thereof is then measured.

The above-mentioned extraction solvent is a solvent comprising acetone and hexane, with the acetone:hexane mass ratio being 42.29:57.71.

In the expression above, $\phi_p$ is the initial weight fraction of the fluororubber (A) relative to the fluororubber composition, and can be measured by thermal analysis, as described below.

The fluororubber composition is subjected to TG/DTA measurements while being heated from room temperature to 600° C. at a rate of temperature increase of 10° C./minute in a nitrogen atmosphere, held at 600° C. for 30 minutes, and then held at 600° C. for 90 minutes in an oxygen atmosphere. The weight loss that occurs at 350° C. or lower is due to loss of additives, the weight loss that occurs at 350 to 600° C. is due to loss of the fluororubber, and the weight loss that occurs when the fluororubber composition is held at 600° C. in an oxygen atmosphere is due to loss of the carbon black. The remainder is metal oxide.

From these weight loss values, it is possible to measure the initial weight fraction of the fluororubber (A) relative to the fluororubber composition.

In the expression above, $\phi_p'$ is the weight fraction of the fluororubber (A) relative to the extraction residue, and can be measured by thermal analysis, as described below.

The extraction residue is subjected to TG/DTA measurements while being heated from room temperature to 600° C. at a rate of temperature increase of 10° C./minute in a nitrogen atmosphere, held at 600° C. for 30 minutes, and then held at 600° C. for 90 minutes in an oxygen atmosphere. The weight loss that occurs at 350° C. or lower is due to loss of additives, the weight loss that occurs at 350 to 600° C. is due to loss of the fluororubber, and the weight loss that occurs when the fluororubber composition is held at 600° C. in an oxygen atmosphere is due to loss of the carbon black. The remainder is metal oxide.

From these weight loss values, it is possible to measure the weight fraction of the fluororubber (A) relative to the extraction residue.

The composition of the present invention can be produced using the following production method. Specifically, the present invention is a method for producing a fluororubber composition, which includes a step (1-1) of mixing the fluororubber (A) and the carbon black (B) by means of an internal mixer until the maximum temperature reaches 80 to 220° C. so as to obtain an intermediate composition, a step (1-2) of cooling the intermediate composition to a temperature of lower than 50° C., and a step (2-1) of mixing the cooled intermediate composition until the maximum temperature reaches not lower than 10° C. but lower than 80° C. so as to obtain a fluororubber composition.

Step (1-1) is a step of mixing the fluororubber (A) and the carbon black (B) by means of an internal mixer until the maximum temperature reaches 80 to 220° C. so as to obtain an intermediate composition.

Step (1-1) is characterized by mixing the fluororubber (A) and the carbon black (B) at a high temperature. By including step (1-1), it is possible to produce a fluororubber composition that can give a crosslinked fluororubber article having excellent mechanical properties at high temperatures.

The mixing in step (1-1) is carried out using an internal mixer. Examples of internal mixers include tangential internal mixers such as Banbury mixers, meshing type internal mixers such as intermix, pressurizing kneader mixers, single screw mixers and twin screw mixers.

When using an internal mixer, the average shear rate of the rotor is preferably 20 to 1000 (1/sec), more preferably 50 to 1000 (1/sec), yet more preferably 100 to 1000 (1/sec), further preferably 200 to 1000 (1/sec), and particularly preferably 300 to 1000 (1/sec).

The average shear rate (1/sec) is calculated using the following expression.

$$\text{Average shear rate (1/sec)} = (\pi \times D \times R)/(60 \text{ (sec)} \times c)$$

(in the expression,
D is the diameter of the rotor or the diameter of the roll (cm)
R is the rate of rotation (rpm)
c is the chip clearance (cm. This is the gap distance between the rotor and the casing or between the rolls)

It is possible to further mix the crosslinking agent (C) and/or the crosslinking accelerator (D) in step (1-1). In cases where the crosslinking agent is a polyol-based crosslinking agent in particular, it is preferable to further mix the crosslinking agent (C) and/or the crosslinking accelerator (D) in step (1-1). It is possible to place the fluororubber (A), the carbon black (B) and the crosslinking agent (C) and/or crosslinking accelerator (D) simultaneously in the internal mixer and then carry out mixing, but it is also possible to mix the fluororubber, crosslinking agent (C) and/or crosslinking accelerator (D) and then mix the carbon black (B).

In addition, it is preferable to further mix an organic amine compound and/or an acid acceptor in step (1-1).

The mixing in step (1-1) is carried out until the maximum temperature of the mixed materials reaches 80 to 220° C. The above-mentioned mixing is preferably carried out until the maximum temperature reaches 120° C. or higher, and preferably until the maximum temperature reaches 200° C. or lower. The above-mentioned maximum temperature can be determined by measuring the temperature of the mixed materials immediately after being discharged from the mixer.

In the present invention, step (1-2) is a step in which the intermediate composition obtained in step (1-1) is cooled to a temperature of lower than 50° C. The intermediate composition obtained in step (1-1) has a temperature of 80 to 220° C., but by carrying out step (2-1) after a sufficiently cooling the intermediate composition, it is possible to produce a fluororubber composition that gives a crosslinked fluororubber article having excellent mechanical properties at high temperatures. In step (1-2), it is preferable for the cooling to be carried out so that the entire intermediate composition reaches a temperature within the above-mentioned range. The lower limit of the cooling temperature is not particularly limited, but may be 10° C.

In step (1-2), it is preferable to carry out the cooling while mixing the intermediate composition using an open roll mixer.

Step (1-1) and step (1-2) may be repeated any number of times. If step (1-1) and step (1-2) are carried out repeatedly, it is preferable for the intermediate composition to be mixed until the maximum temperature reaches 120 to 220° C., and more preferably mixed until the maximum temperature reaches 120 to 140° C., in step (1-1) and step (1-2). If step (1-1) and step (1-2) are carried out repeatedly, the mixing may be carried out using an internal mixer or an open roll mixer.

When using an open roll mixer, the average shear rate of the rotor is preferably 20 (1/sec) or higher, more preferably 50 (1/sec) or higher, yet more preferably 100 (1/sec) or higher, further preferably 200 (1/sec) or higher, particularly preferably 300 (1/sec) or higher, and preferably 1000 (1/sec) or lower.

In the above-mentioned production method, it is preferable to have a step in which the fluororubber (A) and the carbon black (B) are introduced into the internal mixer. In the above-mentioned step, the crosslinking agent (C) and/or the crosslinking accelerator (D) may be introduced, and the organic amine compound and/or the acid acceptor may be introduced.

Step (1-1) may include a step in which arbitrary additives are introduced up to the point at which the intermediate composition is discharged. One or more of these additives may be used. These additives may be introduced one or more times. In cases where two or more types of additive are introduced, the additives may be introduced simultaneously or separately. In addition, a single additive may be introduced a plurality of times. The "step in which arbitrary additives are introduced up to the point at which the intermediate composition is discharged" can be, for example, a step in which a carbon black (B') that is different from the carbon black (B) initially introduced in step (1-1) is introduced up to the point at which the intermediate composition is discharged.

In cases where step (1-1) and step (1-2) are repeated also, each of steps (1-1) may include the above-mentioned "step in which arbitrary additives are introduced up to the point at which the intermediate composition is discharged". For example, in a second step (1-1), it is possible to further introduce a carbon black (B') that is different from the carbon black (B) used in the first step (1-1).

In the above-mentioned production method, step (2-1) is a step in which a fluororubber composition is obtained by mixing the cooled intermediate composition obtained in step (1-2).

Step (2-1) is a step in which the sufficiently cooled intermediate composition obtained in step (1-2) is further mixed, and is an important step in order to improve the high-temperature mechanical properties of a crosslinked fluororubber article.

It is preferable for the mixing in step (2-1) to be carried out until the maximum temperature of the composition reaches not lower than 10° C. but lower than 80° C. If the maximum temperature of the composition during the mixing becomes too high, there are concerns that it will not be possible to obtain a fluororubber composition able to give a crosslinked fluororubber article having excellent mechanical properties at high temperatures.

Step (2-1) may include a step in which different cooled intermediate compositions obtained in step (1-2) are mixed together. In such cases, the mixing should be carried out until the maximum temperature of the mixture of different intermediate compositions reaches not lower than 10° C. but lower than 80° C.

The above-mentioned production method preferably further includes, after step (2-1), a step (2-2) in which step (2-1) is repeated m−1 times (m is an integer of 2 or higher). By carrying out step (2-1) a total of two or more times, it is possible to stably produce a fluororubber composition that can produce a crosslinked fluororubber article having excellent mechanical properties at high temperatures. The above-mentioned m is preferably an integer of 5 or higher, more preferably an integer of 10 or higher, further preferably an integer of 30 or higher, and particularly preferably an integer of 50 or higher. In each of steps (2-2), it is preferable to include a step in which the intermediate composition is cooled before mixing.

The mixing in step (2-1) and step (2-2) can be carried out using the above-mentioned internal mixer or open roll mixer.

It is preferable for step (2-1) and step (2-2) to be steps in which the intermediate composition is mixed by being introduced into an open roll mixer and then tight milled.

When an open roll mixer is used, the intermediate composition is preferably mixed while suppressing heat generation in the fluororubber. Examples of such a mixing method include a method of mixing at high cooling efficiency of a roller and a method of mixing in which the content to be mixed per batch is reduced in weight. In the production method of the present invention, by mixing the intermediate composition while suppressing heat generation in the fluororubber when an open roll mixer is used, the effect of the present invention is remarkably imparted. The production method of the present invention is not limited to such a mixing method.

FIG. 1 is a schematic view showing a method for mixing by tight milling. As shown in FIG. 1(a), the intermediate composition is introduced into an open roll 10 provided with a first roll 11 and a second roll 12. The first roll 11 and the second roll 12 rotate at different speeds in the directions indicated by the arrows. The introduced intermediate composition is rolled into a sheet by being passed between the first roll 11 and the second roll 12 while being subjected to a shearing force, as shown in FIG. 1(b), after which the rolled composition is wound at an arbitrary location, as shown in FIG. 1(c).

From the perspective of obtaining a fluororubber composition able to give a crosslinked fluororubber article having excellent mechanical properties at high temperatures, it is preferable for step (2-1) and step (2-2) to be carried out so that the ratio (P/Q), which is obtained by dividing the values (P) of G'(1%)/G'(100%) of the fluororubber composition obtained in step (2-1) and the fluororubber composition obtained in step (2-2) by the value (Q) of G'(1%)/G'(100%) of the intermediate composition obtained in step (1-2) to both be 0.3 to 1.5, more preferably 1.3 or lower, even more preferably 1.0 or lower, particularly preferably lower than 1.0, and especially 0.9 or lower.

The shear modulus at a dynamic strain of 1% (G'(1%)) and the ratio (G'(1%)/G'(100%)) of the shear modulus (G'(1%)) to the shear modulus at a dynamic strain of 100% (G'(100%)) can be calculated from the dynamic viscoelasticity test, which is measured using a rubber process analyzer (RPA 2000, manufactured by Alpha Technologies) under conditions of 100° C. and 1 Hz after preheating for 1 minute at 100° C.

It is possible to improve the mechanical properties of a crosslinked article at high temperatures even by tight milling just once, but in order to achieve superior mechanical properties at high temperatures, it is preferable to carry out the above-mentioned type milling a total of m times (m is an integer of 2 or higher). The above-mentioned m is preferably an integer of 5 or higher, more preferably an integer of 10 or higher, further preferably an integer of 30 or higher, and particularly preferably an integer of 50 or higher.

The fluororubber composition of the present invention preferably has a value of δG' (G'(1%)–G'(100%)), which is the difference between the shear modulus at a dynamic strain of 1% (G'(1%)) and the shear modulus at a dynamic strain of 100% (G'(100%)), of not lower than 120 kPa and not higher than 3,000 kPa in a dynamic viscoelasticity test (measurement temperature: 100° C., measurement frequency: 1 Hz) carried out on an unvulcanised rubber using a rubber process analyzer (RPA).

Difference δG' is measured and calculated in a dynamic viscoelasticity test using a rubber process analyzer, in which the reinforcing properties of a rubber composition is used as an evaluation parameter.

A fluororubber composition having a difference δG' value of not lower than 120 kPa and not higher than 3,000 kPa is advantageous in terms of resting physical properties, mechanical properties at high temperatures and the like.

Difference δG' is preferably not lower than 150 kPa, and more preferably not lower than 160 kPa, from the perspective of achieving good resting physical properties, mechanical properties at high temperatures and the like, and is preferably not higher than 2,800 kPa, and more preferably not higher than 2,500 kPa, from the perspective of achieving good resting physical properties, hardness, viscosity when extrusion molding, mechanical properties at high temperatures and the like.

It is preferable for the above-mentioned production method to further include a step of mixing the crosslinking agent (C) and/or the crosslinking accelerator (D) with the fluororubber composition obtained in step (2-1) or step (2-2). As mentioned above, it is possible to further mix the crosslinking agent (C) and/or the crosslinking accelerator (D) in step (1-1). Incases where the crosslinking system is a peroxide crosslinking system, it is preferable to mix the crosslinking agent (C) and/or the crosslinking accelerator (D) with the fluororubber composition obtained in step (2-1) or step (2-2) without mixing the crosslinking agent (C) and the crosslinking accelerator (D) in step (1-1).

It is possible to simultaneously mix the crosslinking agent (C) and the crosslinking accelerator (D), but it is also possible to first mix the crosslinking accelerator (D) and then mix the crosslinking agent (C). When mixing is carried out in step (1-1), the mixing conditions for the crosslinking agent (C) and the crosslinking accelerator (D) are the same as the conditions in the above-mentioned step (1-1), except that the maximum temperature during the mixing is not higher than 130° C. Of these, it is preferable to carry out the mixing using an open roll, internal mixer and the like, whereby the average rate of rotation of the rotor is not lower than 20 (1/sec), preferably not lower than 50 (1/sec), more preferably not lower than 100 (1/sec), even more preferably not lower than 200 (1/sec), and particularly preferably not lower than 300 (1/sec). In cases where the crosslinking agent (C) and/or the crosslinking accelerator (D) are mixed with the fluororubber composition obtained in step (2-1) or step (2-2), it is preferable to carry out the mixing so that the maximum temperature is lower than 130° C.

Explanations will now be given of the components of the above-mentioned fluororubber composition.

(A) Fluororubber

The fluororubber (A) used in the present invention preferably contains a structural unit derived from at least one type of monomer selected from among the group comprising, for example, tetrafluoroethylene (TFE), vinylidene fluoride (VdF) and a perfluoro ethylenically unsaturated compound represented by formula (1):

$$CF_2=CF-R_f^a \qquad (1)$$

(where, $R_f^a$ is $-CF_3$ or $-OR_f^b$ ($R_f^b$ is a perfluoroalkyl group having 1 to 5 carbon atoms) (for example, hexafluoropropylene (HFP), a perfluoro(alkyl vinyl ether) (PAVE) and the like).

From a different perspective, the fluororubber is preferably a non-perfluoro fluororubber and a perfluoro fluororubber.

Examples of non-perfluoro fluororubbers include vinylidene fluoride (VdF)-based fluororubbers, tetrafluoroethylene(TFE)/propylene (Pr)-based fluororubbers, tetrafluoroethylene (TFE)/propylene (Pr)/vinylidene fluoride (VdF)-based fluororubbers, ethylene/hexafluoropropylene (HFP)-based fluororubbers, ethylene (Et)/hexafluoropropylene (HFP)/vinylidene fluoride (VdF)-based fluororubbers, ethylene (Et)/hexafluoropropylene (HFP)/tetrafluoroethylene (TFE)-based fluororubbers, fluorosilicone-based fluororubbers and fluorophosphazene-based fluororubbers, and these may be used in isolation or as a combination at quantities that do not impair the effect of the present invention. Of these, VdF-based fluororubbers, TFE/Pr-based fluororubbers and TFE/Pr/VdF-based fluororubbers are more preferred from the perspectives of thermal ageing resistance and oil resistance.

It is preferable for the above-mentioned VdF-based rubber to be such that the VdF repeating units account for not lower than 20 mol % and not higher than 90 mol %, and more preferably not lower than 40 mol % and not higher than 85 mol %, of the total number of moles of VdF repeating units and repeating units derived from other co-monomers. A more preferred lower limit is 45 mol %, and especially 50 mol %, and a more preferred upper limit is 80 mol %.

In addition, co-monomers in the above-mentioned VdF-based rubber are not particularly limited as long as copolymerization with VdF is possible, and examples thereof include, for example, fluorine-containing monomers such as TFE, HFP, PAVE, chlorotrifluoroethylene (CTFE), trifluoroethylene, trifluoropropylene, tetrafluoropropylene, pentafluoropropylene, trifluorobutene, tetrafluoroisobutene, hexafluoroisobutene, vinyl fluoride, iodine-containing fluorinated vinyl ethers, and fluorine-containing monomers represented by general formula (2)

$$CH_2=CFR_f \qquad (2)$$

(where, $R_f$ is a straight chain or branched chain fluoroalkyl group having 1 to 12 carbon atoms); fluorine-free monomers such as ethylene (Et), propylene (Pr) or an alkyl vinyl ether, monomers having a crosslinkable group (a curing site) and reactive emulsifying agents. One or more of these monomers and compounds may be used.

As the aforementioned PAVE, perfluoro(methyl vinyl ether) (PMVE) and perfluoro(propyl vinyl ether) (PPVE) are more preferred, and PMVE is especially preferred.

In addition, the aforementioned PAVE can be a perfluorovinyl ether represented by the formula: $CF_2=CFOCF_2OR_f^c$ (where, $R_f^c$ is a straight chain or branched chain perfluoroalkyl group having 1 to 6 carbon atoms, a cyclic perfluoroalkyl group having 5 to 6 carbon atoms or a straight chain or branched chain perfluorooxyalkyl group having 2 to 6 carbon atoms and containing 1 to 3 oxygen atoms), and $CF_2=CFOCF_2OCF_3$, $CF_2=CFOCF_2OCF_2CF_3$ and $CF_2=CFOCF_2OCF_2CF_2OCF_3$ are preferred.

The above-mentioned fluorine-containing monomer represented by formula (2) is preferably a monomer in which $R_f$ is a straight chain fluoroalkyl group, and more preferably a monomer in which $R_f$ is a straight chain perfluoroalkyl group. The number of carbon atoms in $R_f$ is preferably 1 to 6. Examples of the above-mentioned fluorine-containing monomer represented by formula (2) include $CH_2=CFCF_3$, $CH_2=CFCF_2CF_3$, $CH_2=CFCF_2CF_2CF_3$, $CH_2=CFCF_2CF_2CF_3$, and of these, 2,3,3,3-tetrafluoropropylene, which is represented by $CH_2=CFCF_3$, is preferred.

Examples of the above-mentioned VdF-based rubber include VdF/HFP copolymers, VdF/TFE/HFP copolymers, VdF/CTFE copolymers, VdF/CTFE/TFE copolymers, VdF/PAVE copolymers, VdF/TFE/PAVE copolymers, VdF/HFP/PAVE copolymers, VdF/HFP/TFE/PAVE copolymers, VdF/TFE/propylene (Pr) copolymers, VdF/ethylene (Et)/HFP copolymers and copolymers of VdF and fluorine-containing monomers represented by formula (2). Of these, copolymers having at least one type of monomer selected from among the group comprising TFE, HFP and PAVE as the monomer other than VdF are preferred, at least one type of copolymer selected from among the group comprising VdF/HFP copolymers, VdF/TFE/HFP copolymers, copolymers of VdF and fluorine-containing monomers represented by formula (2), VdF/PAVE copolymers, VdF/TFE/PAVE copolymers, VdF/HFP/PAVE copolymers and VdF/HFP/TFE/PAVE copolymers is more preferred, at least one type of copolymer selected from among the group comprising VdF/HFP copolymers, VdF/HFP/TFE copolymers, copolymers of VdF and fluorine-containing monomers represented by formula (2) and VdF/PAVE copolymers is further preferred, and at least one type of bipolymer selected from among the group comprising VdF/HFP copolymers, copolymers of VdF and fluorine-containing monomers represented by formula (2) and VdF/PAVE copolymers is even more preferred. Of these, at least one type of bipolymer selected from among the group comprising VdF/HFP copolymers and copolymers of VdF and fluorine-containing monomers represented by formula (2) is particularly preferred.

A bipolymer is a copolymer comprising repeating units derived from only two types of monomer.

In the case of a VdF/HFP copolymer, the VdF/HFP composition is preferably (45 to 85)/(55 to 15) (mol %), more preferably (50 to 80)/(50 to 20) (mol %), and further preferably (60 to 80)/(40 to 20) (mol %).

In the case of a VdF/TFE/HFP copolymer, the VdF/TFE/HFP composition is preferably (30 to 80)/(4 to 35)/(10 to 35) (mol %).

In the case of a VdF/PAVE copolymer, the VdF/PAVE composition is preferably (65 to 90)/(35 to 10) (mol %).

In the case of a VdF/TFE/PAVE copolymer, the VdF/TFE/PAVE composition is preferably (40 to 80)/(3 to 40)/(15 to 35) (mol %).

In the case of a VdF/HFP/PAVE copolymer, the VdF/HFP/PAVE composition is preferably (65 to 90)/(3 to 25)/(3 to 25) (mol %).

In the case of a VdF/HFP/TFE/PAVE copolymer, the VdF/HFP/TFE/PAVE composition is preferably (40 to 90)/(0 to 25)/(0 to 40)/(3 to 35) (mol %), and more preferably (40 to 80)/(3 to 25)/(3 to 40)/(3 to 25) (mol %).

In the case of a bipolymer of VdF and a fluorine-containing monomer represented by formula (2), it is preferable for the VdF/fluorine-containing monomer (2) unit molar ratio to be between 85/15 and 20/80 and for monomer units other than VdF and the fluorine-containing monomer (2) to account for 0 to 50 mol % of the total quantity of monomer units, and the VdF/fluorine-containing monomer (2) unit molar ratio is more preferably between 80/20 and 20/80. In addition, it is also preferable for the VdF/fluorine-containing monomer (2) unit molar ratio to be between 85/15 and 50/50 and for monomer units other than VdF and the fluorine-containing monomer (2) to account for 1 to 50 mol % of the total quantity of monomer units. Preferred examples of monomer units other than VdF and the fluorine-containing monomer unit (2) include the above-mentioned VdF co-monomers, such as TFE, HFP, PMVE, perfluoroethyl vinyl ether (PEVE), PPVE, CTFE, trifluoroethylene, hexafluoroisobutene, vinyl fluoride, ethylene (Et), propylene (Pr), alkyl vinyl ethers, monomers having a crosslinkable group and reactive emulsifying agents. Of these, PMVE, CTFE, HFP and TFE are more preferred.

A TFE/propylene (Pr)-based fluororubber means a fluorine-containing copolymer comprising 45 to 70 mol % of TFE and 55 to 30 mol % of propylene (Pr). In addition to these two components, this type of fluororubber may contain 0 to 40 mol % of a specific third component (for example, PAVE).

In the case of an Ethylene (Et)/HFP copolymer, the Et/HFP composition is preferably (35 to 80)/(65 to 20) (mol %), and more preferably (40 to 75)/(60 to 25) (mol %).

In the case of an Et/HFP/TFE copolymer, the Et/HFP/TFE composition is preferably (35 to 75)/(25 to 50)/(0 to 15) (mol %), and more preferably (45 to 75)/(25 to 45)/(0 to 10) (mol %).

Examples of perfluoro fluororubbers include those comprising TFE/PAVE and the like. The TFE/PAVE composition is preferably (50 to 90)/(50 to 10) (mol %), more preferably (50 to 80)/(50 to 20) (mol %), and further preferably (55 to 75)/(45 to 25) (mol %).

In this case, the PAVE can be PMVE, PPVE and the like, and it is possible to use these in isolation or as an arbitrary combination thereof.

The number average molecular weight (Mn) of the fluororubber (A) is preferably 5,000 to 500,000, more preferably 10,000 to 500,000, and particularly preferably 20,000 to 500,000.

In addition, in cases where, for example, it is necessary for the fluororubber composition to have a low viscosity, the above-mentioned fluororubber (A) may be blended with another fluororubber. Examples of other fluororubbers include low molecular weight liquid fluororubbers (number average molecular weight: 1,000 or higher), low molecular weight fluororubbers having number average molecular weights of approximately 10,000 and fluororubbers having number average molecular weights of approximately 100,000 to 200,000.

From the perspective of processability, the Mooney viscosity at 100° C. of the fluororubber (A) is 20 to 200, and preferably 30 to 180. The Mooney viscosity is measured in accordance with ASTM-D1646 and JIS K 6300.

The above-mentioned non-perfluoro fluororubbers and perfluoro fluororubbers can be produced using a common method such as emulsion polymerization, suspension polymerization or solution polymerization. In particular, by using a polymerization method that uses an iodine (or bromine) compound, which is known as iodine (or bromine) transfer polymerization, it is possible to produce a fluororubber having a narrow molecular weight distribution.

The materials exemplified as the aforementioned non-perfluoro fluororubbers and perfluoro fluororubbers constitute the primary monomer, and it is possible to advantageously use a material obtained by copolymerizing a monomer having a crosslinkable group, but it is preferable for the fluororubber (A) not to contain a repeating unit derived from a monomer having a crosslinkable group. A monomer having a crosslinkable group should be one able to introduce a crosslinkable group that is suitable for the production method or crosslinking system, for example a publicly known polymerizable compound or chain transfer agent containing an iodine atom, a bromine atom, a carbon-carbon double bond, a cyano group, a carboxyl group, a hydroxyl group, an amino group, an ester group and the like.

Preferred examples of monomers having crosslinkable groups include a compound represented by General formula (3):

$$CY^1{}_2=CY^2R_f{}^2X^1 \quad (3)$$

(where, $Y^1$ and $Y^2$ each denote a fluorine atom, a hydrogen atom or —$CH_3$; $R_f{}^2$ denotes a straight chain or branched chain fluorine-containing alkylene group which may have one or more ether linkage type oxygen atoms, which may have an aromatic ring and in which some or all of the hydrogen atoms are substituted by fluorine atoms; and $X^1$ denotes an iodine atom or a bromine atom).

Specifically, it is possible to use, for example, an iodine-containing monomer or bromine-containing monomer represented by general formula (4):

$$CY^1{}_2=CY^2R_f{}^3CHR^1-X^1 \quad (4)$$

(where, $Y^1$, $Y^2$ and $X^1$ are the same as mentioned above, $R_f{}^3$ denotes a straight chain or branched chain fluorine-containing alkylene group which may have one or more ether linkage type oxygen atoms and in which some or all of the hydrogen atoms are substituted by fluorine atoms, that is, a straight chain or branched chain fluorine-containing alkylene group in which some or all of the hydrogen atoms are substituted by fluorine atoms, a straight chain or branched chain fluorine-containing oxyalkylene group in which some or all of the hydrogen atoms are substituted by fluorine atoms or a straight chain or branched chain fluorine-containing polyoxyalkylene group in which some or all of the hydrogen atoms are substituted by fluorine atoms; and R1 denotes a hydrogen atom or a methyl group), or an iodine-containing monomer or bromine-containing monomer represented by general formulae (5) to (22):

$$CY^4{}_2=CY^4(CF_2)_n-X^1 \quad (5)$$

(where, the $Y^4$ groups may be the same or different, and are hydrogen atoms or fluorine atoms, and n is an integer between 1 and 8)

$$CF_2=CFCF_2R_f{}^4-X^1 \quad (6)$$

(where, $R_f{}^4$ is —$(OCF_2)_n$— or —$(OCF(CF_3))_n$— [Chemical formula 1]

and n is an integer between 0 and 5)

$$CF_2=CFCF_2(OCF(CF_3)CF_2)_m(OCH_2CF_2CF_2)_nOCH_2CF_2-X^1 \quad (7)$$

(where, m is an integer between 0 and 5 and n is an integer between 0 and 5)

$$CF_2=CFCF_2(OCH_2CF_2CF_2)_m(OCF(CF_3)CF_2)_nOCF(CF_3)-X^1 \quad (8)$$

(where, m is an integer between 0 and 5 and n is an integer between 0 and 5)

$$CF_2=CF(OCF_2CF(CF_3))_mO(CF_2)_n-X^1 \quad (9)$$

(where, m is an integer between 0 and 5 and n is an integer between 1 and 8)

$$CF_2=CF(OCF_2CF(CF_3))_m-X^1 \quad (10)$$

(where, m is an integer between 1 and 5)

$$CF_2=CFOCF_2(CF(CF_3)OCF_2)_nCF(-X^1)CF_3 \quad (11)$$

(where, n is an integer between 1 and 4)

$$CF_2=CFO(CF_2)_nOCF(CF_3)-X^1 \quad (12)$$

(where, n is an integer between 2 and 5)

$$CF_2=CFO(CF_2)_n-(C_6H_4)-X^1 \quad (13)$$

(where, n is an integer between 1 and 6)

$$CF_2=CF(OCF_2CF(CF_3))_nOCF_2CF(CF_3)-X^1 \quad (14)$$

(where, n is an integer between 1 and 2)

$$CH_2=CFCF_2O(CF(CF_3)CF_2O)_nCF(CF_3)-X^1 \quad (15)$$

(where, n is an integer between 0 and 5)

$$CF_2=CFO(CF_2CF(CF_3)O)_m(CF_2)_n-X^1 \quad (16)$$

(where, m is an integer between 0 and 5 and n is an integer between 1 and 3)

$$CH_2=CFCF_2OCF(CF_3)OCF(CF_3)-X^1 \quad (17)$$

$$CH_2=CFCF_2OCH_2CF_2-X^1 \quad (18)$$

$$CF_2=CFO(CF_2CF(CF_3)O)_mCF_2CF(CF_3)-X^1 \quad (19)$$

(where, m is an integer of 0 or higher)

$$CF_2=CFOCF(CF_3)CF_2O(CF_2)_n-X^1 \quad (20)$$

(where, n is an integer of 1 or higher)

$$CF_2=CFOCF_2OCF_2CF(CF_3)OCF_2-X^1 \quad (21)$$

$$CH_2=CH-(CF_2)_nX^1 \quad (22)$$

(where, n is an integer between 2 and 8)
(in general formulae (5) to (22), $X^1$ is the same as mentioned above),
and it is possible to use these in isolation or as an arbitrary combination thereof.

The iodine-containing monomer or bromine-containing monomer represented by general formula (4) is preferably an iodine-containing fluorinated vinyl ether represented by general formula (23):

[Chemical formula 2]

$$I(CH_2CF_2CF_2O)_m(CFCF_2O)_nCF=CF_2 \quad (23)$$
$$\overset{|}{CF_3}$$

(where, m is an integer between 1 and 5 and n is an integer between 0 and 3).
More specifically, it is possible to use

[Chemical formula 3]

$ICH_2CF_2CF_2OCF=CF_2$,     $I(CH_2CF_2CF_2O)_2CF=CF_2$,
$I(CH_2CF_2CF_2O)_3CF=CF_2$, $ICH_2CF_2CF_2OCFCF_2OCF=CF_2$,
                                                $\overset{|}{CF_3}$
$ICH_2CF_2CF_2O(CFCF_2O)_2CF=CF_2$
$\overset{|}{CF_3}$ and the like, but of these, $ICH_2CF_2CF_2OCF=CF_2$ is preferred.

Specifically, the iodine-containing monomer or bromine-containing monomer represented by general formula (5) is preferably $ICF_2CF_2CF=CH_2$ or $I(CF_2CF_2)_2CF=CH_2$.

Specifically, the iodine-containing monomer or bromine-containing monomer represented by general formula (9) is preferably $I(CF_2CF_2)_2OCF=CF_2$.

Specifically, the iodine-containing monomer or bromine-containing monomer represented by general formula (22) is preferably $CH_2=CHCF_2CF_2I$ or $I(CF_2CF_2)_2CH=CH_2$.

In addition, a bis-olefin compound represented by the formula:

$$R^2R^3C=CR^4-Z-CR^5=CR^6R^7$$

(where, $R^2$, $R^3$, $R^4$, $R^5$, $R^6$ and $R^7$ may be the same or different, and each denote H or an alkyl group having 1 to 5 carbon atoms, and Z denotes a straight chain or branched-chain alkylene or cycloalkylene group having 1 to 18 carbon atoms, which may contain an oxygen atom and which is preferably at least partially fluorinated, or a (per)fluoropolyoxyalkylene group) is also preferred as a monomer having a crosslinkable group. Moreover, "(per)fluoropolyoxyalkylene group" means "a fluoropolyoxyalkylene group or a perfluoropolyoxyalkylene group" in the present specification.

Z is preferably a (per)fluoroalkylene group having 4 to 12 carbon atoms, and $R^2$, $R^3$, $R^4$, $R^5$, $R^6$ and $R^7$ are preferably hydrogen atoms.

In cases where Z is a (per)fluoropolyoxyalkylene group, a (per)fluoropolyoxyalkylene)fluoropolyoxyalkylene group represented by the formula:

$$-(Q)_p-CF_2O-(CF_2CF_2O)_m-(CF_2O)_n-CF_2(Q)_p-$$

(where, Q is an alkylene group having 1 to 10 carbon atoms or an oxyalkylene group having 2 to 10 carbon atoms, p is 0 or 1, and m and n are integers such that m/n is 0.2 to 5 and the molecular weight of said (per)fluoropolyoxyalkylene group is 500 to 10,000, and preferably 1,000 to 4,000) is preferred.
In this formula, Q is preferably selected from among $-CH_2OCH_2-$ and $-CH_2-O-(CH_2CH_2O)_sCH_2-$ (s=1 to 3).

Preferred bis-olefins include:
$CH_2=CH-(CF_2)_4-CH=CH_2$,
$CH_2=CH-(CF_2)_6-CH=CH_2$, and
bis-olefins represented by the formula: $CH_2=CH-Z^1-CH=CH_2$
(where, $Z^1$ is $-CH_2OCH_2-CF_2O-(CF_2CF_2O)_m-(CF_2O)_n-CF_2-CH_2OCH_2-$ (m/n=0.5)).

Of these, 3,3,4,4,5,5,6,6,7,7,8,8-dodecafluoro-1,9-decadiene, which is represented by $CH_2=CH-(CF_2)_6-CH=CH_2$, is preferred.

(B) Carbon Black

Examples of types of carbon black include furnace black, acetylene black, thermal black, channel black and graphite, and specific examples thereof include SAF-HS($N_2$SA: 142 m²/g, DBP: 130 ml/100 g), SAF ($N_2$SA: 142 m²/g, DBP: 115 ml/100 g), N234 ($N_2$SA: 126 m²/g, DBP: 125 ml/100 g), ISAF ($N_2$SA: 119 m²/g, DBP: 114 ml/100 g), ISAF-LS ($N_2$SA: 106 m²/g, DBP: 75 ml/100 g), ISAF-HS ($N_2$SA: 99 m²/g, DBP: 129 ml/100 g), N339 ($N_2$SA: 93 m²/g, DBP: 119 ml/100 g), HAF-LS ($N_2$SA: 84 m²/g, DBP: 75 ml/100 g), HAS-HS ($N_2$SA: 82 m²/g, DBP: 126 ml/100 g), HAF ($N_2$SA: 79 m²/g, DBP: 101 ml/100 g), N351 ($N_2$SA: 74 m²/g, DBP: 127 ml/100 g), LI-HAF ($N_2$SA: 74 m²/g, DBP: 101 ml/100 g), MAF-HS($N_2$SA: 56 m²/g, DBP: 158 ml/100 g), MAF ($N_2$SA: 49 m²/g, DBP: 133 ml/100 g), FEF-HS($N_2$SA: 42 m²/g, DBP: 160 ml/100 g), FEF ($N_2$SA: 42 m²/g, DBP: 115 ml/100 g), SRF-HS ($N_2$SA: 32 m²/g, DBP: 140 ml/100 g), SRF-HS($N_2$SA: 29 m²/g, DBP: 152 ml/100 g), GPF ($N_2$SA: 27 m²/g, DBP: 87 ml/100 g), SRF ($N_2$SA: 27 m²/g, DBP: 68 ml/100 g) and SRF-LS ($N_2$SA: 23 m²/g, DBP: 51 ml/100 g). Of these, SAF-HS, SAF, N234, ISAF, ISAF-LS, ISAF-HS, N339, HAF-LS, HAS-HS, HAF, N351, LI-HAF and MAF-HS are preferred.

These types of carbon black can be used in isolation or as a combination of two or more types thereof.

Of these, it is preferable for the carbon black to have a nitrogen adsorption specific surface area ($N_2$SA) of 25 to 180 m²/g and a dibutyl phthalate (DBP) absorption number of 45 to 180 ml/100 g. Moreover, when a carbon black having high $N_2$SA and DBP values is used, the values for loss elastic modulus (E') and storage elastic modulus (E') increase, as mentioned below.

If the nitrogen adsorption specific surface area ($N_2$SA) is lower than 25 m²/g, the mechanical properties tend to deteriorate when the carbon black is blended with a rubber, and for this reason, the nitrogen adsorption specific surface area (N₂SA) is preferably not lower than 50 m²/g, more preferably not lower than 70 m²/g, even more preferably not lower than 90 m²/g, and particularly preferably not lower than 110 m²/g. The upper limit is preferably 180 m²/g from the perspective of general ease of procurement.

If the dibutyl phthalate (DBP) absorption number is lower than 45 ml/100 g, the mechanical properties tend to deteriorate when the carbon black is blended with a rubber, and for this reason, the dibutyl phthalate (DBP) absorption number is not lower than 50 ml/100 g, preferably not lower than 60 ml/100 g, particularly preferably not lower than 80 ml/100 g, and further preferably not lower than 90 ml/100 g. From the perspective of general ease of procurement, the upper limit is preferably 175 ml/100 g, and especially 170 ml/100 g.

It is preferable to blend 5 to 65 parts by mass of the carbon black (B) relative to 100 parts by mass of the fluororubber (A). If the blending quantity of the carbon black (B) is too high or too low, the mechanical properties of the crosslinked article tend to deteriorate. From the perspective of obtaining a good balance of physical properties, the blending quantity of carbon black is preferably not lower than 6 parts by mass, and more preferably not lower than 10 parts by mass, relative to 100 parts by mass of the fluororubber (A), and is preferably not higher than 55 parts by mass, more preferably not higher than 50 parts by mass, even more preferably not higher than 49 parts by mass, and particularly preferably not higher than 45 parts by mass, relative to 100 parts by mass of the fluororubber (A) from the perspective of obtaining a good balance of physical properties.

Crosslinking Agent (C) and Crosslinking Accelerator (D)

The crosslinking agent (C) and the crosslinking accelerator (D) can be selected as appropriate according to the crosslinking system, the type of fluororubber (A) being crosslinked (for example, the copolymer composition, the presence/absence and type of crosslinkable groups), the specific intended use or mode of use of the obtained crosslinked article, mixing conditions and the like.

The crosslinking system can be, for example, a peroxide crosslinking system, a polyol crosslinking system, a polyamine crosslinking system, an oxazole crosslinking system, a thiazole crosslinking system, an imidazole crosslinking system, a triazine crosslinking system and the like.
(Peroxide Crosslinking System)

When crosslinking by means of a peroxide crosslinking system, because a carbon-carbon bond is present at a crosslinking site, chemical resistance and steam resistance are superior to a polyol crosslinking system, in which a carbon-oxygen bond is present at a crosslinking site, or a polyamine crosslinking system, in which a carbon-nitrogen double bond is present.

A crosslinking agent for a peroxide crosslinking system should be a peroxide capable of readily generating peroxy radicals in the presence of heat or an oxidation-reduction system, and specific examples thereof include organic peroxides such as 1,1-bis(t-butylperoxy)-3,5,5-trimethylcyclohexane, 2,5-dimethylhexane-2,5-dihydroperoxide, di-t-butylperoxide, t-butylcumyl peroxide, dicumyl peroxide, α,α-bis(t-butylperoxy)-p-diisopropylbenzene, α,α-bis(t-butylperoxy)-m-diisopropylbenzene, 2,5-dimethyl-2,5-di(t-butylperoxy)hexane, 2,5-dimethyl-2,5-di(t-butylperoxy)hexyne-3, benzoyl peroxide, t-butylperoxybenzene, t-butylperoxybenzoate, t-butylperoxymaleic acid and t-butylperoxyisopropyl carbonate. Of these, 2,5-dimethyl-2,5-di(t-butylperoxy)hexane and 2,5-dimethyl-2,5-di(t-butylperoxy)hexyne-3 are preferred.

In addition, it is generally preferable to incorporate a crosslinking accelerator in a peroxide crosslinking system. Examples of crosslinking accelerators for peroxide-based crosslinking agents, and especially organic peroxide-based crosslinking agents, include triallyl cyanurate, triallyl isocyanurate (TAIC), triacrylformal, triallyl trimellitate, N,N'-m-phenylene bismaleimide, dipropargyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine-2,4,6-trione), tris (diallylamine)-S-triazine, N,N-diallylacrylamide, 1,6-divinyldodecafluorohexane, hexaallylphosphoramide, N,N,N', N'-tetraallylphthalamide, N,N,N',N'-tetraallylmaronamide, trivinylisocyanurate, 2,4,6-trivinylmethyltrisiloxane, tri(5-norbornene-2-methylene)cyanurate and triallylphosphite. Of these, triallyl isocyanurate (TAIC) is preferred from the perspectives of crosslinking properties and the physical properties of a crosslinked article.

It is possible to use a crosslinking accelerator having low self polymerization properties as a crosslinking accelerator used in a peroxide crosslinking system. A crosslinking accelerator having low self polymerization properties means a compound having low self polymerization properties, unlike triallyl isocyanurate (TAIC), which is well-known as a crosslinking accelerator.

Examples of crosslinking accelerators having low self polymerization properties include:

trimethallyl isocyanurate (TMAIC), which is represented by

[Chemical formula 4]

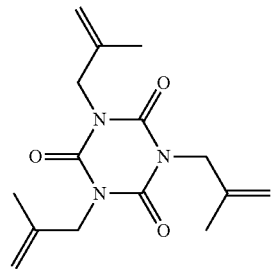

p-quinonedioxime, which is represented by

[Chemical formula 5]

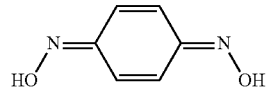

p,p'-dibenzoylquinonedioxime, which is represented by

[Chemical formula 6]

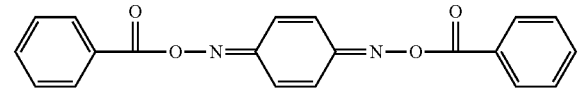

maleimide, which is represented by

[Chemical formula 7]

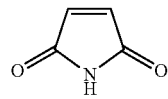

N-phenylene maleimide, which is represented by

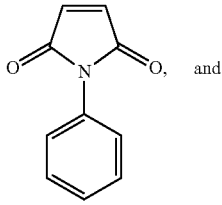

[Chemical formula 8]

and

N,N'-phenylene bismaleimide, which is represented by

[Chemical formula 9]

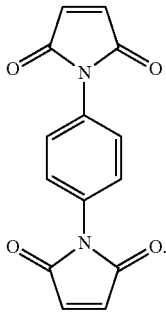

A preferred crosslinking accelerator having low self polymerization properties is trimethallyl isocyanurate (TMAIC).

It is possible to use a bis-olefin as a crosslinking accelerator used in a peroxide crosslinking system.

Examples of bis-olefins able to be used as crosslinking accelerators include bis-olefins represented by the formula:

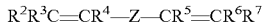

$R^2R^3C=CR^4—Z—CR^5=CR^6R^7$ (where, $R^2$, $R^3$, $R^4$, $R^5$, $R^6$ and $R^7$ may be the same or different, and each denote H or an alkyl group having 1 to 5 carbon atoms, and Z denotes a linear (straight chain) or branched-chain alkylene or cycloalkylene group having 1 to 18 carbon atoms, which may contain an oxygen atom and which is preferably at least partially fluorinated, or a (per))fluoropoly-oxyalkylene group).

Z is preferably a perfluoroalkylene group having 4 to 12 carbon atoms, and $R^2$, $R^3$, $R^4$, $R^5$, $R^6$ and $R^7$ are preferably hydrogen atoms.

In cases where Z is a (per)fluoropolyoxyalkylene group, a (per)fluoropolyoxyalkylene)fluoropolyoxyalkylene group represented by the formula:

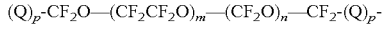

$(Q)_p\text{-}CF_2O—(CF_2CF_2O)_m—(CF_2O)_n—CF_2\text{-}(Q)_p\text{-}$ (where, Q is an alkylene or oxyalkylene group having 1 to 10 carbon atoms, p is 0 or 1, and m and n are integers such that m/n is 0.2 to 5 and the molecular weight of said (per)fluoropolyoxyalkylene group is 500 to 10,000, and preferably 1,000 to 4,000) is preferred. In this formula, Q is preferably selected from among —CH$_2$OCH$_2$— and —CH$_2$—O (CH$_2$CH$_2$O)$_s$CH$_2$— (s=1 to 3).

Preferred bis-olefins include:
CH$_2$=CH—(CF$_2$)$_4$—CH=CH$_2$,
CH$_2$=CH—(CF$_2$)$_6$—CH=CH$_2$, and
bis-olefins represented by the formula:

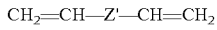

CH$_2$=CH—Z'—CH=CH$_2$ (where, $Z^1$ is —CH$_2$OCH$_2$—CF$_2$O—(CF$_2$CF$_2$O)$_m$—(CF$_2$O)$_n$—CF$_2$—CH$_2$OCH$_2$— (m/n=0.5)).

Of these, 3,3,4,4,5,5,6,6,7,7,8,8-dodecafluoro-1,9-decadi-ene, which is represented by CH$_2$=CH—(CF$_2$)$_6$—CH=CH$_2$, is preferred.

In addition, from the perspective of crosslinking properties, a fluororubber that contains iodine atoms and/or bromine atoms as crosslinking sites is preferred as a fluororubber (A) that is suitable for a peroxide crosslinking system. From the perspective of obtaining a good balance of physical properties, the content of iodine atoms and/or bromine atoms is preferably 0.001 to 10 mass %, more preferably 0.01 to 5 mass %, and particularly preferably 0.1 to 3 mass %.

The blending quantity of a peroxide-based crosslinking agent is preferably 0.01 to 10 parts by mass, more preferably 0.1 to 9 parts by mass, and particularly preferably 0.2 to 8 parts by mass, relative to 100 parts by mass of the fluororubber (A). If the blending quantity of the peroxide-based crosslinking agent is lower than 0.01 parts by mass, crosslinking of the fluororubber (A) tends not to progress sufficiently, and if the blending quantity of the peroxide-based crosslinking agent exceeds 10 parts by mass, the balance between physical properties tends to deteriorate.

In addition, the blending quantity of the crosslinking accelerator is generally 0.01 to 10 parts by mass, and preferably 0.1 to 9 parts by mass, relative to 100 parts by mass of the fluororubber (A). If the blending quantity of the crosslinking accelerator is lower than 0.01 parts by mass, there is a tendency for undercuring to occur, and if the blending quantity of the crosslinking accelerator exceeds 10 parts by mass, the balance between physical properties tends to deteriorate.

(Polyol Crosslinking System)

Crosslinking by means of a polyol crosslinking system is preferable due to carbon-oxygen bonds being present at crosslinking sites, the permanent compression set being low and moldability being excellent.

Compounds known in the past as crosslinking agents for fluororubbers can be used as polyol crosslinking agents, and it is preferable to use, for example, a polyhydroxy compound, and especially an aromatic polyhydroxy compound from the perspective of achieving excellent heat resistance.

The above-mentioned aromatic polyhydroxy compound is not particularly limited, and can be, for example, 2,2-bis(4-hydroxyphenyl)propane (hereinafter referred to as "bisphenol A"), 2,2-bis(4-hydroxyphenyl)perfluoropropane (hereinafter referred to as "bisphenol AF"), resorcin, 1,3-dihydroxybenzene, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, hydroquinone, catechol, 2,2-bis(4-hydroxyphenyl)butane (hereinafter referred to as "bisphenol B"), 4,4-bis(4-hydroxyphenyl)valeric acid, 2,2-bis(4-hydroxyphenyl)tetrafluorodichloropropane, 4,4'-dihydroxy-diphenylsulfone, 4,4'-dihydroxydiphenylketone, tri(4-hydroxyphenyl)methane, 3,3'5,5'-tetrachlorobisphenol A and 3,3'5,5'-tetrabromobisphenol A. These aromatic polyhydroxy compounds may be in the form of alkali metal salts, alkaline earth metal salts and the like, but in cases where an acid is used to coagulate a copolymer, it is preferable not to use the above-mentioned metal salts.

Of these, polyhydroxy compounds are preferred from the perspective of the obtained crosslinked fluororubber article exhibiting a low permanent compression set and excellent moldability, and aromatic polyhydroxy compounds are more preferred from the perspective of achieving excellent heat resistance, with bisphenol AF being particularly preferred.

In addition, it is generally preferable to incorporate a crosslinking accelerator in a polyol crosslinking system. By using a crosslinking accelerator, it is possible to facilitate a crosslinking reaction due to an intramolecular double bond being generated in a reaction in which hydrofluoric acid is eliminated from the main chain of the fluororubber and addition of the polyhydroxy compound to the generated double bond being facilitated.

Onium compounds are commonly used as crosslinking accelerators for polyol crosslinking systems. The onium compound is not particularly limited, and can be, for example, an ammonium compound such as a quaternary ammonium salt, a phosphonium compound such as a quaternary phosphonium salt, an oxonium compound, a sulfonium compound, a cyclic amine or a monofunctional amine compounds. Of these, quaternary ammonium salts and quaternary phosphonium salts are preferred.

The quaternary ammonium salt is not particularly limited, and can be, for example, 8-methyl-1,8-diazabicyclo[5.4.0]-7-undecenium chloride, 8-methyl-1,8-diazabicyclo[5.4.0]-7-undecenium iodide, 8-methyl-1,8-diazabicyclo[5.4.0]-7-undecenium hydroxide, 8-methyl-1,8-diazabicyclo[5.4.0]-7-undecenium methyl sulfate, 8-ethyl-1,8-diazabicyclo[5.4.0]-7-undecenium bromide, 8-propyl-1,8-diazabicyclo[5.4.0]-7-undecenium bromide, 8-dodecyl-1,8-diazabicyclo[5.4.0]-7-undecenium chloride, 8-dodecyl-1,8-diazabicyclo[5.4.0]-7-undecenium hydroxide, 8-eicosyl-1,8-diazabicyclo[5.4.0]-7-undecenium chloride, 8-tetracosyl-1,8-diazabicyclo[5.4.0]-7-undecenium chloride, 8-benzyl-1,8-diazabicyclo[5.4.0]-7-undecenium chloride (hereinafter referred to as "DBU-B"), 8-benzyl-1,8-diazabicyclo[5.4.0]-7-undecenium hydroxide, 8-phenethyl-1,8-diazabicyclo[5.4.0]-7-undecenium chloride and 8-(3-phenylpropyl)-1,8-diazabicyclo[5.4.0]-7-undecenium chloride. Of these, DBU-B is preferred from the perspectives of crosslinking properties and the physical properties of a crosslinked article.

In addition, the quaternary phosphonium salt is not particularly limited, and can be, for example, tetrabutyl phosphonium chloride, benzyl triphenyl phosphonium chloride (hereinafter referred to as "BTPPC"), benzyl trimethyl phosphonium chloride, benzyl tributyl phosphonium chloride, tributyl allyl phosphonium chloride, tributyl-2-methoxypropyl phosphonium chloride or benzyl phenyl (dimethyl amino) phosphonium chloride. Of these, benzyl triphenyl phosphonium chloride (BTPPC) is preferred from the perspectives of crosslinking properties and the physical properties of a crosslinked article.

In addition, it is possible to use a solid solution of bisphenol AF and a quaternary ammonium salt or quaternary phosphonium salt or the chlorine-free crosslinking accelerator disclosed in Japanese Patent Application Publication No. H11-147891 as a crosslinking accelerator.

The blending quantity of the polyol crosslinking agent is preferably 0.01 to 10 parts by mass, and more preferably 0.1 to 7 parts by mass, relative to 100 parts by mass of the fluororubber (A). If the blending quantity of the polyol crosslinking agent is lower than 0.01 parts by mass, crosslinking of the fluororubber (A) tends not to progress sufficiently, and if the blending quantity of the polyol crosslinking agent exceeds 10 parts by mass, the balance between physical properties tends to deteriorate.

In addition, the blending quantity of the crosslinking accelerator is preferably 0.01 to 8 parts by mass, and more preferably 0.02 to 5 parts by mass, relative to 100 parts by mass of the fluororubber (A). If the blending quantity of the crosslinking accelerator is lower than 0.01 parts by mass, crosslinking of the fluororubber (A) tends not to progress sufficiently, and if the blending quantity of the peroxide-based crosslinking agent exceeds 8 parts by mass, the balance between physical properties tends to deteriorate.

(Polyamine Crosslinking System)

Crosslinking by means of polyamine crosslinking is characterized by a carbon-nitrogen double bond being present at a crosslinking site and excellent dynamic mechanical characteristics being achieved. However, there is a tendency for the permanent compression set to be higher than in cases in which crosslinking is effected by means of a polyol crosslinking system or a peroxide crosslinking system.

Examples of polyamine-based crosslinking agents include polyamine compounds such as hexamethylenediamine carbamate, N,N'-dicinnamylidene-1,6-hexamethylenediamine and 4,4'-bis(aminocyclohexyl)methane carbamate. Of these, N,N'-dicinnamylidene-1,6-hexamethylenediamine is preferred.

The blending quantity of the polyamine-based crosslinking agent is preferably 0.01 to 10 parts by mass, and more preferably 0.2 to 7 parts by mass, relative to 100 parts by mass of the fluororubber (A). If the blending quantity of the polyamine-based crosslinking agent is lower than 0.01 parts by mass, crosslinking of the fluororubber (A) tends not to progress sufficiently, and if the blending quantity of the polyol crosslinking agent exceeds 10 parts by mass, the balance between physical properties tends to deteriorate.

In the present invention, a peroxide crosslinking system or polyol crosslinking system is preferred as the crosslinking system, and it is preferable to use a crosslinking agent (C) that is appropriate for the crosslinking system used. Of these, it is more preferable to use a crosslinking agent for a peroxide crosslinking system.

Common rubber components such as fillers, processing aids, plasticizers, colorants, tackifiers, adhesive aids, acid acceptors, pigments, flame retardants, lubricants, photostabilizers, weathering stabilizers, anti-static agents, ultraviolet radiation absorbers, antioxidants, mold release agents, foaming agents, perfumes, oils, softening agents and other polymers such as polyethylene, polypropylene, polyamides, polyesters and polyurethanes can, if necessary, be blended in the above-mentioned fluororubber composition at quantities that do not impair the effect of the present invention.

Examples of fillers include metal oxides such as calcium oxide, titanium oxide, aluminum oxide and magnesium oxide; metal hydroxides such as magnesium hydroxide aluminum hydroxide and calcium hydroxide; carbonates such as magnesium carbonate, aluminum carbonate, calcium carbonate and barium carbonate; silicates such as magnesium silicate, calcium silicate, sodium silicate and aluminum silicate; sulfates such as aluminum sulfate, calcium sulfate and barium sulfate; synthetic hydrotalcite; metal sulfides such as molybdenum disulfide, iron sulfide and copper sulfide; diatomaceous earth, asbestos, Charlton white (zinc sulfide/barium sulfide), graphite, fluorocarbons, calcium fluoride, coke, fine quartz powder, talc, powdered mica, wollastonite, carbon fibers, aramid fibers, whiskers, glass fibers, organic reinforcing agents, organic fillers, polytetrafluoroethylene, mica, silica, celite and clay. In addition, acid acceptors include calcium oxide, magnesium oxide, lead oxide, zinc oxide, magnesium hydroxide, calcium hydroxide, aluminum hydroxide and hydrotalcite. These may be used in isolation or as a combination of two or more types thereof as appropriate. These may be added at any step in the above-mentioned mixing method, but are preferably added when mixing the fluororubber (A) and the carbon black (B) using an internal mixer or an open roll mixer.

Processing aids include higher fatty acids such as stearic acid, oleic acid, palmitic acid and lauric acid; higher fatty acid salts such as sodium stearate and zinc stearate; higher fatty acid amides such as stearic acid amide and oleic acid amide;

higher fatty acid esters such as ethyl oleate; petroleum-based waxes such as carnauba wax and ceresin wax; polyglycols such as ethylene glycol, glycerin and diethylene glycol; aliphatic hydrocarbons such as Vaseline and paraffin; silicone-based oils, silicone-based polymers, low molecular weight polyethylene, phthalic acid esters, phosphoric acid esters, rosin, (halogenated) dialkylamines, surfactants, sulfone compounds, fluorine-based additives and organic amine compounds.

Of these, organic amine compounds and acid acceptors are preferred blending components from the perspective of improving the reinforcingproperties by beingpresent when the fluororubber (A) and the carbon black (B) are mixed using an internal mixer or an open roll mixer.

Preferred examples of organic amine compounds include primary amines represented by $R^1NH_2$, secondary amines represented by $R^1R^2NH$, and tertiary amines represented by $R^1R^2R^3N$. $R^1$, $R^2$ and $R^3$ may be the same or different, and are each preferably an alkyl group having 1 to 50 carbon atoms, and the alkyl groups may contain a benzene ring as a functional group and may contain a double bond or a conjugated double bond. Moreover, the alkyl groups may be straight chain or branched chain alkyl groups.

Examples of primary amines include coconut amine, octylamine, lauryl amine, stearyl amine, oleyl amine, tallow amine, 17-phenyl-heptadecylamine, octadeca-7,11-dienylamine, octadeca-7,9-dienylamine, octadec-9-enylamine and 7-methyl-octadec-7-enylamine, examples of secondary amines include distearyl amine, and examples of tertiary amines include dimethyloctylamine, dimethyldecylamine, dimethyllaurylamine, dimethylmyristylamine, dimethylpalmitylamine, dimethylstearylamine and dimethylbehenylamine. Of these, amines, and particularly primary amines, having approximately 20 carbon atoms are preferred from the perspectives of ease of procurement and increased reinforcing properties.

It is preferable to blend 0.01 to 5 parts by mass of the organic amine compound relative to 100 parts by mass of the fluororubber (A). If the blending quantity of the organic amine compound is too high, mixing tends to become difficult, and if the blending quantity of the organic amine compound is too low, the reinforcing properties tend to deteriorate. A more preferred blending quantity is not lower than 0.1 parts by mass relative to 100 parts by mass of the fluororubber (A) from the perspective of reinforcing properties and not higher than 4 parts by mass from the perspectives of reinforcing properties and ease of mixing.

Of the acid acceptors mentioned above, metal hydroxides such as calcium hydroxide; metal oxides such as magnesium oxide and zinc oxide; and hydrotalcite are preferred from the perspective of reinforcing properties, with zinc oxide being particularly preferred.

It is preferable to blend 0.01 to 10 parts by mass of the acid acceptor relative to 100 parts by mass of the fluororubber (A). If the blending quantity of the acid acceptor is too high, the physical properties tend to deteriorate, and if the blending quantity of the acid acceptor is too low, the reinforcing properties tend to deteriorate. A more preferred blending quantity is not lower than 0.1 parts by mass relative to 100 parts by mass of the fluororubber (A) from the perspective of reinforcing properties and not higher than 8 parts by mass, and especially not higher than 5 parts by mass, from the perspectives of physical properties and ease of mixing.

By crosslinking the fluororubber composition of the present invention, it is possible to obtain a crosslinked fluororubber article.

The method for crosslinking the fluororubber composition should be selected as appropriate, but can be, for example, a molding method such as extrusion molding or molding by wrapping and steaming or an ordinary crosslinking method such as a crosslinking method that uses a crosslinking jacket and the like. In addition, in cases where secondary crosslinking is required due to the intended use of the crosslinked article, oven crosslinking may be carried out.

In addition, the crosslinked fluororubber article achieves particularly excellent resting physical properties and mechanical properties at high temperatures when the loss elastic modulus (E") is not lower than 400 kPa and not higher than 6,000 kPa in a dynamic viscoelasticity test (measurement mode: tensile, chuck gap: 20 mm, tensile strain: 1%, measurement frequency: Hz, static tension value when the static load conditions are a constant force during strain dispersion: 157 cN, measurement temperature: 160° C.).

The lower limit of the loss elastic modulus is preferably 420 kPa, and more preferably 430 kPa, and the upper limit of the loss elastic modulus is preferably 5,900 kPa, and more preferably 5,800 kPa.

In addition, from the perspective of improving mechanical properties at high temperature, it is preferable for the obtained crosslinked fluororubber article to exhibit a storage elastic modulus (E') of not lower than 1,500 kPa and not higher than 20,000 kPa in a dynamic viscoelasticity test (measurement mode: tensile, chuck gap: 20 mm, measurement temperature: 160° C., tensile strain: 1%, static tension value when the static load conditions are a constant force during strain dispersion: 157 cN, measurement frequency: 10 Hz). The lower limit of the storage elastic modulus is preferably 1,600 kPa, and more preferably 1,800 kPa, and the upper limit of the storage elastic modulus is preferably 19,000 kPa, and more preferably 18,000 kPa.

In addition, in order to be suitable for use in high-temperature environments, it is preferable for the crosslinked fluororubber article to exhibit a tensile elongation at break at 160° C. of 100 to 700%, more preferably not lower than 110% and even more preferably not lower than 120%, and more preferably not higher than 680% and even more preferably not higher than 650%.

In addition, in order to be suitable for use in high-temperature environments, it is preferable for the crosslinked fluororubber article to exhibit a tensile strength at break at 160° C. of not lower than 1 MPa, more preferably not lower than 1.5 MPa, and particularly preferably not lower than 2 MPa, and preferably not higher than 30 MPa, and more preferably not higher than 28 MPa. The tensile strength at break and tensile elongation at break are measured in accordance with JIS-K 6251 using a No. 6 dumbbell.

In addition, in order to be suitable for use in high-temperature environments, it is preferable for the crosslinked fluororubber article to exhibit a tearing strength at 160° C. of 3 to 30 kN/m, more preferably not lower than 4 kN/m and even more preferably not lower than 5 kN/m, and more preferably not higher than 29 kN/m, and even more preferably not higher than 28 kN/m.

In addition, in order to be suitable for use in high-temperature environments, it is preferable for the crosslinked fluororubber article to exhibit a tensile elongation at break at 200° C. of 100 to 700%, more preferably not lower than 110% and even more preferably not lower than 120%, and more preferably not higher than 680% and even more preferably not higher than 650%.

In addition, in order to be suitable for use in high-temperature environments, it is preferable for the crosslinked fluororubber article to exhibit a tensile strength at break at 200° C.

of 1 to 30 MPa, more preferably not lower than 1.5 MPa, and particularly preferably not lower than 2 MPa, and preferably not higher than 29 MPa, and more preferably not higher than 28 MPa.

In addition, in order to be suitable for use in high-temperature environments, it is preferable for the crosslinked fluororubber article to exhibit a tearing strength at 200° C. of 3 to 30 kN/m, more preferably not lower than 4 kN/m and even more preferably not lower than 5 kN/m, and more preferably not higher than 29 kN/m, and even more preferably not higher than 28 kN/m.

The above-mentioned crosslinked fluororubber article can be used in a variety of applications, but can be used particularly advantageously in the various applications mentioned below.

(1) Hoses

The hose maybe a hose having a single layer structure comprising only a crosslinked fluororubber article obtained by crosslinking the fluororubber composition of the present invention, but may also be a multilayer hose having a multilayer structure also containing other layers.

Examples of hoses having single layer structures include exhaust gas hoses, EGR hoses, turbocharger hoses, fuel hoses, brake hoses and oil hoses.

Examples of hoses having multilayer structures also include exhaust gas hoses, EGR hoses, turbocharger hoses, fuel hoses, brake hoses and oil hoses.

Turbocharger systems are often installed in diesel engines, and are systems whereby exhaust gas from the engine cause a turbine to rotate, thereby driving a compressor that is linked to the turbine, increasing the compression ratio of the air supplied to the engine and increasing the power output of the engine. This type of turbocharger system, which uses exhaust gas from the engine and achieves a high power output, leads to a reduction in engine size, lower fuel consumption and purification of exhaust gas.

Turbocharger hoses are used in turbocharger systems as hoses for supplying compressed air to the engine. In order to effectively use the space in cramped engine compartments, rubber hoses having excellent flexibility and softness are useful, and it is typical to use hoses having multilayer structures in which a rubber (and especially a fluororubber) layer having excellent thermal ageing resistance and oil resistance is used as an inner layer and a silicone rubber or acrylic rubber is used as an outer layer. However, the space around the engine, such as the engine compartment, is subjected to high temperatures and is a harsh environment in which vibration occurs, meaning that it is essential to use a hose that exhibits not only excellent thermal ageing resistance, but also excellent mechanical properties at high temperatures.

By using a crosslinked fluororubber layer obtained by crosslinking the fluororubber composition of the present invention as a rubber layer in a single layer structure or multilayer structure, it is possible to provide a turbocharger hose which can easily satisfy these required properties and which exhibits excellent properties.

In hoses having multilayer structures other than turbocharger hoses, examples of layers comprising other materials include layers comprising other types of rubber, layers comprising thermoplastic resins, fiber reinforcing layers and metal foil layers.

In cases where chemical resistance and softness are particularly required, the other type of rubber is preferably at least one type of rubber selected from among the group comprising acrylonitrile-butadiene rubbers or hydrogenated products thereof, blended rubbers obtained by blending acrylonitrile-butadiene rubbers and poly(vinyl chloride), fluororubbers, epichlorohydrin rubbers, EPDM and acrylic rubbers, and more preferably at least one type of rubber selected from among the group comprising acrylonitrile-butadiene rubbers or hydrogenated products thereof, blended rubbers obtained by blending acrylonitrile-butadiene rubbers and poly(vinyl chloride), fluororubbers and epichlorohydrin rubbers.

In addition, the thermoplastic resin is preferably at least one type of thermoplastic resin selected from among the group comprising fluororesins, polyamide-based resins, polyolefin-based resins, polyester-based resins, poly(vinyl alcohol)-based resins, poly(vinyl chloride)-based resins and poly(phenylene sulfide)-based resins, and more preferably at least one type of thermoplastic resin selected from among the group comprising fluororesins, polyamide-based resins, poly(vinyl alcohol)-based resins and poly(phenylene sulfide)-based resins.

In addition, when producing a hose having a multilayer structure, surface treatment may be carried out if necessary. This surface treatment is not particularly limited as long as the surface treatment enables adhesion, and can be, for example, discharge treatment such as plasma discharge treatment or corona discharge treatment or wet type metallic sodium/naphthalene treatment. In addition, primer treatment is also preferred as a surface treatment. Primer treatment can be carried out using a conventional method. When carrying out primer treatment, it is possible to treat the surface of a fluororubber that has not been subjected to a surface treatment, but it is more effective to carry out primer treatment after carrying out plasma discharge treatment, corona discharge treatment or treatment using metallic sodium/naphthalene.

The above-mentioned hoses can be advantageously used in other fields, such as those mentioned below.

The above-mentioned hoses can be used in hoses for CVD apparatuses exposed to high-temperature environments, dry etching apparatuses, wet etching apparatuses, oxidation diffusion apparatuses, sputtering apparatuses, ashing apparatuses, washing apparatuses, ion injection apparatuses, exhaust apparatuses and the like in fields relating to semiconductor manufacturing, such as semiconductor manufacturing apparatuses, liquid crystal panel manufacturing apparatuses, plasma panel manufacturing apparatuses, plasma address liquid crystal panels, field emission display panels and solar cell substrates.

In the automotive field, the above-mentioned hoses can be used in peripheral equipment for engines and automatic transmissions, and can be used as EGR hoses, exhaust gas hoses, fuel hoses, oil hoses and brake hoses in addition to turbocharger hoses.

In addition, the above-mentioned hoses can also be used in fields such as aviation, rockets, ships, chemical plants, analytical/scientific instruments, food processing plant equipment and atomic power plant equipment.

(2) Sealing Materials

When used as a sealing material, the above-mentioned crosslinked fluororubber article can be advantageously used in fields such as those mentioned below.

For example, the above-mentioned crosslinked fluororubber article can be used in sealing materials such as gaskets and contact or non-contact packing materials, which require heat resistance, oil resistance, fuel oil resistance, resistance to anti-freeze used for engine cooling and steam resistance, in engine bodies, main driving systems, valve systems, lubricating/cooling systems, fuel systems, air intake/discharge systems for automotive engines; transmission systems for drive systems; chassis steering systems; braking systems; basic electrical components of electrical equipment, electrical components of control systems, electrical components of accessories and the like (self-sealing packing, piston rings, split ring type packing, mechanical seals, oil seals and the like).

Sealing materials used in engine bodies for automotive engines are not particularly limited, but can be, for example, sealing materials such as cylinder head gaskets, cylinder head cover gaskets, oil pan packing, ordinary gaskets, O-rings, packing and timing belt cover gaskets.

Sealing materials used in main driving systems for automotive engines are not particularly limited, but can be, for example, crankshaft seals or camshaft seals.

Sealing materials used in valve systems for automotive engines are not particularly limited, but can be, for example, valve stem oil seals for engine valves and valve seats for butterfly valves.

Sealing materials used in lubricating/cooling systems for automotive engines are not particularly limited, but can be, for example, sealing gaskets for engine oil coolers.

Sealing materials used in fuel systems for automotive engines are not particularly limited, but can be, for example, oil seals for fuel pumps, filler seals for fuel tanks, tank packing and the like, connector O-rings for fuel tubes and the like, injector concussion rings for fuel injection systems, injector seal rings, injector O rings and the like, flange gaskets for carburetors and the like, EGR sealing materials and the like.

Sealing materials used in air intake/discharge systems for automotive engines are not particularly limited, but can be, for example, intake manifold packing, exhaust manifold packing, throttle body packing and turbocharger turbine shaft packing.

Sealing materials used in transmission systems for automotive engines are not particularly limited, but can be, for example, transmission-related bearing seals, oil seals, O-rings and packing and the like, and O-rings and packing for automatic transmission systems.

Sealing materials used in automotive braking systems are not particularly limited, but can be, for example, oil seals, O-rings, packing and the like, piston cups (rubber cups) for master cylinders and the like, caliper seals, boots and the like.

Sealing materials used in automotive electrical components are not particularly limited, but can be, for example, O-rings and packing for vehicle air conditioning systems.

Sealing materials are particularly suitable as sealing materials for sensors (bushes), and especially sealing materials for oxygen sensors, sealing materials for nitrogen oxide sensors, sealing materials for sulfur oxide sensors and the like. O-rings may also be square rings.

Applications in fields other than the automotive field are not particularly limited, and the sealing material can be widely used in fields such as aviation, rockets, ships, oil well drilling (for example, packer seals, MWD seals, LWD seals and the like), chemical plants, pharmaceutical applications, photographic applications such as developers, printing applications such as printing equipment, coating applications such as coating equipment, analytical/scientific instruments, food processing plant equipment, atomic power plant equipment, iron and steel-related applications such as iron plate processing equipment, general industrial applications, electrical applications, fuel cells, electronic components and molding applications such as on-site construction molds.

For example, the sealing material can be oil-resistant, chemical-resistant, heat-resistant, steam-resistance or weathering-resistant packing, O-rings or other sealing materials in transport-related fields such as shipping or aviation; similar packing, O-rings or sealing materials in the field of oil well drilling; similar packing, O-rings or sealing materials in the field of chemical plants; similar packing, O-rings or sealing materials in the fields of food processing plant equipment and food processing equipment (including domestic equipment); similar packing, O-rings or sealing materials in the field of atomic power plant equipment; and similar packing, O-rings or sealing materials in the field of general industrial equipment.

(3) Belts

The above-mentioned crosslinked fluororubber article can be advantageously used in belts such as those mentioned below.

It is possible to use the fluororubber composition of the present invention in a belt material for a power transmission belt (including a flat belt, V-belt, V-ribbed belt, toothed belt and the like) or conveyor belt. In addition, the above-mentioned crosslinked fluororubber article can be used in belt materials for CVD apparatuses exposed to high-temperature environments, dry etching apparatuses, wet etching apparatuses, oxidation diffusion apparatuses, sputtering apparatuses, ashing apparatuses, washing apparatuses, ion injection apparatuses, exhaust apparatuses and the like in fields relating to semiconductor manufacturing, such as semiconductor manufacturing apparatuses, liquid crystal panel manufacturing apparatuses, plasma panel manufacturing apparatuses, plasma address liquid crystal panels, field emission display panels and solar cell substrates.

Examples of flat belts include flat belts used in high-temperature locations, such as around engines in agricultural equipment, machine tools, industrial equipment and the like. Examples of conveyor belts include conveyor belts used to transport loose materials or granular materials, such as coal, crushed stone, sand, mineral ores and wood chips, in high-temperature environments, conveyor belts used in furnaces in ironworks and the like, and conveyor belts used in applications where exposure to high-temperature environments occurs, such as precision instrument assembly plants, food processing plants and the like. Examples of V-belts and V-ribbed belts include V-belts and V-ribbed belts used in agricultural equipment, general equipment (office automation equipment, printing equipment, industrial dryers and the like) and automotive applications. Examples of toothed belts include toothed belts used in drive belts for delivery robots and drive belts for food processing equipment, machine tools and the like, and toothed belts used in automotive applications, office automation equipment, medical applications, printing equipment and the like. In particular, timing belts are examples of automotive toothed belts.

Moreover, in belt materials having multilayer structures, examples of layers comprising other materials include layers comprising other types of rubber, layers comprising thermoplastic resins, fiber reinforcing layers, canvas and metal foil layers.

In cases where chemical resistance and softness are particularly required, the other type of rubber is preferably at least one type of rubber selected from among the group comprising acrylonitrile-butadiene rubbers or hydrogenated products thereof, blended rubbers obtained by blending acrylonitrile-butadiene rubbers and poly(vinyl chloride), fluororubbers, epichlorohydrin rubbers, EPDM and acrylic rubbers, and more preferably at least one type of rubber selected from among the group comprising acrylonitrile-butadiene rubbers or hydrogenated products thereof, blended rubbers obtained by blending acrylonitrile-butadiene rubbers and poly(vinyl chloride), fluororubbers, epichlorohydrin rubbers.

In addition, the thermoplastic resin is preferably at least one type of thermoplastic resin selected from among the group comprising fluororesins, polyamide-based resins, polyolefin-based resins, polyester-based resins, poly(vinyl alcohol)-based resins, poly(vinyl chloride)-based resins and poly(phenylene sulfide)-based resins, and more preferably at least one type of thermoplastic resin selected from among the group comprising fluororesins, polyamide-based resins, poly (vinyl alcohol)-based resins and poly(phenylene sulfide)-based resins.

In addition, when producing a belt material having a multilayer structure, surface treatment may be carried out if necessary. This surface treatment is not particularly limited as long as the surface treatment enables adhesion, and can be, for example, discharge treatment such as plasma discharge treatment or corona discharge treatment or wet type metallic sodium/naphthalene treatment. In addition, primer treatment is also preferred as a surface treatment. Primer treatment can be carried out using a conventional method. When carrying out primer treatment, it is possible to treat the surface of a fluororubber that has not been subjected to a surface treatment, but it is more effective to carry out primer treatment after carrying out plasma discharge treatment, corona discharge treatment or treatment using metallic sodium/naphthalene.

(4) Rubber Vibration Insulators

By using the above-mentioned crosslinked fluororubber article as a single layer or multilayer rubber layer in a rubber vibration insulator, it is possible to provide an automotive rubber vibration insulator which can easily satisfy the properties required of a rubber vibration insulator and which exhibits excellent properties.

In multilayer rubber vibration insulators other than automotive rubber vibration insulators, examples of layers comprising other materials include layers comprising other types of rubber, layers comprising thermoplastic resins, fiber reinforcing layers and metal foil layers.

In cases where chemical resistance and softness are particularly required, the other type of rubber is preferably at least one type of rubber selected from among the group comprising acrylonitrile-butadiene rubbers or hydrogenated products thereof, blended rubbers obtained by blending acrylonitrile-butadiene rubbers and poly(vinyl chloride), fluororubbers, epichlorohydrin rubbers, EPDM and acrylic rubbers, and more preferably at least one type of rubber selected from among the group comprising acrylonitrile-butadiene rubbers or hydrogenated products thereof, blended rubbers obtained by blending acrylonitrile-butadiene rubbers and poly(vinyl chloride), fluororubbers, epichlorohydrin rubbers.

In addition, the thermoplastic resin is preferably at least one type of thermoplastic resin selected from among the group comprising fluororesins, polyamide-based resins, polyolefin-based resins, polyester-based resins, poly(vinyl alcohol)-based resins, poly(vinyl chloride)-based resins and poly(phenylene sulfide)-based resins, and more preferably at least one type of thermoplastic resin selected from among the group comprising fluororesins, polyamide-based resins, poly (vinyl alcohol)-based resins and poly(phenylene sulfide)-based resins.

In addition, when producing a rubber vibration insulator having a multilayer structure, surface treatment may be carried out if necessary. This surface treatment is not particularly limited as long as the surface treatment enables adhesion, and can be, for example, discharge treatment such as plasma discharge treatment or corona discharge treatment or wet type metallic sodium/naphthalene treatment. In addition, primer treatment is also preferred as a surface treatment. Primer treatment can be carried out using a conventional method. When carrying out primer treatment, it is possible to treat the surface of a fluororubber that has not been subjected to a surface treatment, but it is more effective to carry out primer treatment after carrying out plasma discharge treatment, corona discharge treatment or treatment using metallic sodium/naphthalene.

(5) Diaphragms

The above-mentioned crosslinked fluororubber article can be advantageously used in diaphragms such as those mentioned below.

In automotive engine applications, for example, the above-mentioned crosslinked fluororubber article can be used as a diaphragm for a fuel system, exhaust system, braking system, drive system or ignition system, where heat resistance, oxidation resistance, fuel resistance, low gas permeability and the like are required.

Examples of diaphragms used in automotive engine fuel systems include diaphragms for fuel pumps, diaphragms for carburetors, diaphragms for pressure regulators, diaphragms for pulsation dampers, ORVR diaphragms, diaphragms for canisters and diaphragms for automatic fuel cocks.

Examples of diaphragms used in automotive engine exhaust systems include diaphragms for waste gates, diaphragms for actuators and EGR diaphragms.

Examples of diaphragms used in automotive engine braking systems include diaphragms for air brakes.

Examples of diaphragms used in automotive engine drive systems include oil pressure diaphragms.

Examples of diaphragms used in automotive engine ignition systems include diaphragms for distributors.

Examples of applications other than in automotive engines include diaphragms for ordinary pumps, diaphragms for valves, diaphragms for filter presses, diaphragms for blowers, diaphragms for air conditioning equipment, diaphragms for control equipment, diaphragms for water feed systems, diaphragms used in pumps used to supply hot water, diaphragms for high temperature steam, diaphragms for semiconductor manufacturing (for example, diaphragms for transporting chemicals used in manufacturing processes), diaphragms for food processing equipment, diaphragms for liquid storage tanks, diaphragms for pressure switches, diaphragms used in oil exploration/oil well drilling (for example, diaphragms used to supply lubricating oils for oil well drilling bits and the like), diaphragms for gas appliances such as gas-fired instantaneous water heater and gas meters, diaphragms for accumulators, diaphragms for suspension air springs and the like, diaphragms for naval screw feeders and diaphragms for artificial hearts, for which heat resistance, oil resistance, chemical resistance, steam resistance and low gas permeability are required.

(6) Hollow Rubber Molded Articles The above-mentioned crosslinked fluororubber article can also be advantageously used in hollow rubber molded articles.

Examples of the above-mentioned hollow rubber molded articles include bladders, molded articles having bellows-like structures and primer pumps.

(6-1) Bladders

The above-mentioned crosslinked fluororubber article can be advantageously used in a bladder used in a tire vulcanizing process or molding process (a bladder used for tire manufacturing).

In tire manufacturing processes, the types of bladder used are generally divided into two types, namely tire molding bladders, which are used when molding a green tire (unvulcanised tire) after assembling the various constituent components of the tire, and tire vulcanization bladders, which are used in order to impart the shape of the finished tire product during vulcanization.

The above-mentioned crosslinked fluororubber article can be used in both tire molding bladders and tire vulcanization bladders, but is preferably used in tire vulcanization bladders, which are repeatedly used under hot conditions and which require excellent heat resistance and tensile properties at high temperatures.

(6-2) Molded Articles Having Bellows-Like Structures

A bellows-like structure is, for example, a structure having protrusions and/or recesses in the circumferential direction of a cylinder, and the shape of the protrusions and recesses may be a curved wave-like shape or a triangular wave shape.

Specific examples of molded articles having bellows-like structures include joints such as flexible joints and expansion joints, boots and grommets.

Joint members are joints used in pipes and piping equipment, and are used in applications such as preventing vibration and noise emanating from piping systems, absorbing expansion/contraction or displacement caused by fluctuations in temperature or pressure, absorbing dimensional fluctuations and ameliorating and preventing the effects of earthquakes and ground subsidence.

Flexible joints and expansion joints can be advantageously used as molded articles having complex shapes in, for example, piping for shipbuilding, piping for pumps, compressors and the like, piping for chemical plants, electric piping, piping for civil engineering/water and automotive piping.

Boots are preferably molded articles having complex shapes, such as boots used in a variety of industries, for example automotive boots such as constant velocity joint boots, dust covers, rack and pinion steering boots, pin boots and piston boots, boots for agricultural equipment, boots for industrial vehicles, boots for construction equipment, boots for hydraulic equipment, boots for pneumatic equipment, boots for centralized lubrication equipment, boots for transporting liquids, boots for firefighting equipment and boots for transporting a variety of liquefied gases.

The molded article having a complex shape of the present invention can be advantageously used in primer bulbs such as those mentioned below. Examples include primer bulbs used in vehicles, ships, aircraft, construction equipment, agricultural equipment and mining equipment. For example, the above-mentioned primer bulb is particularly useful as a naval primer bulb.

(6-3) Primer Bulbs

Figure 2:
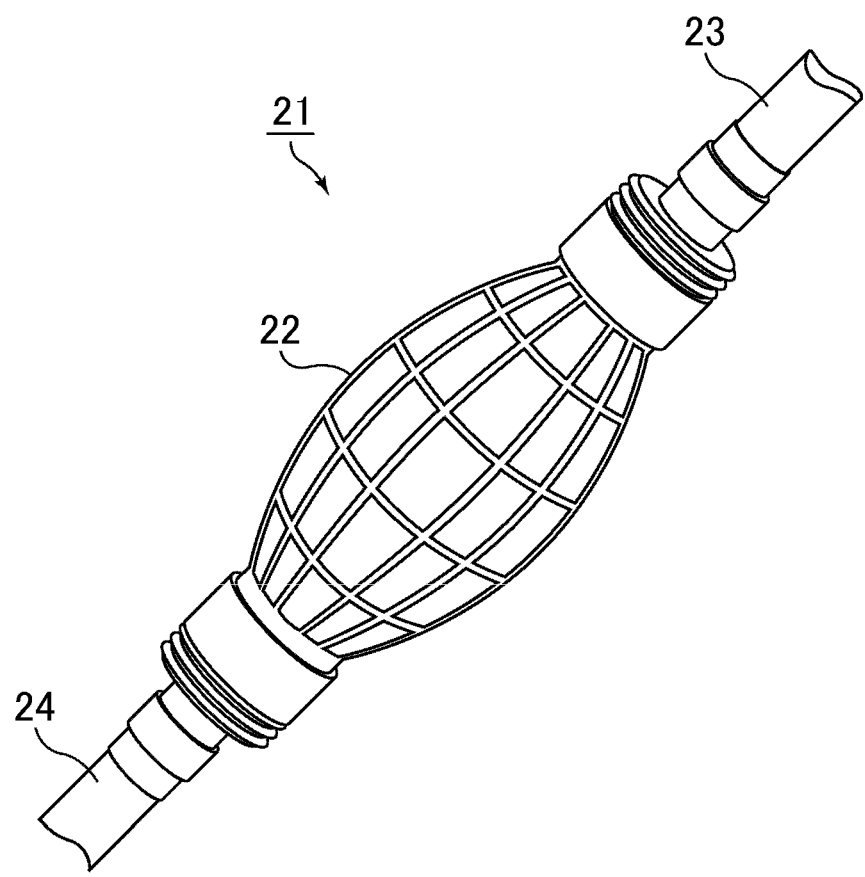
FIG. 2 is a schematic view showing one example of the shape of a primer bulb.

A primer bulb is a pump for supplying fuel to a carburetor (a float chamber in a carburetor) so that an engine can be easily started. A primer bulb has a single protrusion in the circumferential direction of a cylinder, and the shape of the protrusion is a curved wave-like shape. The shape of the primer bulb is, for example, the shape shown in FIG. 2, and the primer bulb 21 is generally disposed between a hose 23 on the discharge side (engine side) and a hose 24 on the intake side (fuel tank side).

Examples of the above-mentioned primer bulb include primer bulbs used in vehicles, ships, aircraft, construction equipment, agricultural equipment and mining equipment. For example, the above-mentioned primer bulb is particularly useful as a naval primer bulb.

(7) Fluororubber Coating Material Compositions

The fluororubber composition of the present invention can also be used as a fluororubber coating material composition. A coating film obtained from the above-mentioned fluororubber coating material composition exhibits excellent tensile properties at high temperatures, and therefore does not break under high-temperature conditions.

The above-mentioned fluororubber coating material composition is preferably one in which the fluororubber composition of the present invention is dissolved or dispersed in a liquid medium. In cases where the fluororubber composition of the present invention is used in a fluororubber coating material composition, the fluororubber composition may further contain at least a polyol crosslinking agent or polyamine crosslinking agent in addition to the above-mentioned fluororubber (A) and carbon black (B).

The above-mentioned fluororubber coating material composition can be prepared by dissolving or dispersing the fluororubber composition, which is obtained by mixing the components that constitute the fluororubber composition by means of, for example, the above-mentioned method, in a liquid medium such as a ketone, ester or ether.

The above-mentioned fluororubber coating material composition may be coated directly on a substrate comprising a metal, glass, resin, rubber and the like, or coated on a substrate after a primer layer is formed on the substrate from an epoxy coating material and the like. Furthermore, another coating film (a top coat layer) may be formed on the coating film obtained from the above-mentioned fluororubber coating material composition.

A coating film obtained from the above-mentioned fluororubber coating material composition can be used in, for example, a sheet or belt; a sealant for a cylindrical member; a pre-coated metal; a packing rubber, O-ring, diaphragm, chemical-resistant tube, chemical stopper, fuel hose, valve seal, chemical plant gasket or engine gasket; a roll (for example, a fixing roll or contact bonding roll) for office automation equipment such as a copier, printer or fax machine, a conveyor belt and the like. The above-mentioned engine gasket can be, for example, a head gasket for an automotive engine and the like.

(8) Wire Coating Materials

The above-mentioned fluororubber composition can also be advantageously used in an insulating coating material for wires or a sheet material that forms a sheath layer on the outer periphery of an insulating layer of a wire, for which heat resistance and softness (flexibility) are required, and can give a coating film having excellent flexibility at high temperatures.

The above-mentioned insulating coating material or sheath material can be an insulating coating material or sheath material used for heat-resistant wires in automobiles, aircraft, military vehicles and the like, for which heat resistance is particularly required. Of these, the above-mentioned insulating coating material or sheath material is suitable as an insulating coating material or sheet material used in coated wires that are used in environments where the wires come into contact with transmission oil or engine oil of an internal combustion engine or inside automatic transmission systems or engine oil pans of vehicles.

(9) Biodiesel Fuel-Resistant Members (BDF-Resistant Members)

The above-mentioned crosslinked fluororubber article can also be advantageously used in members that come into contact with diesel fuel from biological sources, that is, biodiesel fuels (BDF). Biodiesel fuel includes fuel for diesel engines that is obtained by processing and/or refining a biomass raw material.

In cases where the above-mentioned crosslinked fluororubber article is used in a BDF-resistant member, if the above-mentioned crosslinked fluororubber article contains an acid acceptor, the acid acceptor reacts with the BDF, thereby swelling the crosslinked fluororubber article and raising concerns regarding deterioration, and it is therefore preferable for the above-mentioned crosslinked fluororubber article not to contain an acid acceptor in such cases. In other words, in cases where a crosslinked article obtained from the fluororubber composition of the present invention is used in a BDF-resistant member, it is preferable not to blend an acid acceptor in the fluororubber composition.

The above-mentioned biodiesel fuel-resistant member can be used in a variety of applications where contact with BDF occurs, for example, films, sheets, hoses such as vehicle fuel hoses and oil filler hoses, underground tubes for gasoline stations, bottles such as tanks for vehicle fuel, containers, tanks, automotive seals such as diaphragms, packing, flange gaskets for carburetors and O-rings for fuel pumps, and a variety of mechanical seals such as seals for hydraulic equipment.

Of these, the above-mentioned biodiesel fuel-resistant member is preferably a hose or sealing material, and more preferably a hose.

EXAMPLES

The present invention will now be explained through the use of examples, but the present invention is not limited only to these examples.

The methods for measuring the various physical properties used in the present invention are as follows.

(1) Mooney Viscosity ($ML_{1+10}$ (100° C.))

The Mooney viscosity is measured in accordance with ASTM-D1646 and JIS K 6300. The measurement temperature is 100° C.

(2) Measurement of Tensile Strength at Break and Tensile Elongation at Break

The test equipment used is a "Tensilon" RTG-1310 manufactured by A & D and a "Strograph" TH-200D manufactured by Toyo Seiki Seisaku-sho. The tensile strength at break and tensile elongation at break are measured in accordance with JIS-K 6251, using a No. 6 dumbbell, a chuck gap of 50 mm and a stress rate of 500 mm/min. The measurement temperatures are 25° C. and 160° C.

(3) Tensile Fatigue Test

In accordance with JIS-K 6270 and using a No. 6 dumbbell, a repeated tensile strain is applied at a stroke of 60 mm, a frequency of 2 Hz, a temperature of 150° C. and a chuck gap of 50 mm, and the number of cycles until the dumbbell breaks is counted. The measurement is carried out a maximum of 10,000 times.

(4) Shear Modulus (G')

A method for measuring the shear modulus at a dynamic strain of 1% (G'(1%)) and the ratio (G'(1%)/G' (100%)) of the shear modulus (G'(1%)) to the shear modulus at a dynamic strain of 100% (G'(100%)) at a dynamic strain of 1% (G' (1%))

The dynamic viscoelasticity is measured using a rubber process analyzer (RPA 2000, manufactured by Alpha Technologies) under conditions of 100° C. and 1 Hz after preheating for 1 minute at 100° C.

The following fluororubbers, carbon blacks, crosslinking agent, crosslinking accelerator, processing aids and acid acceptor were used in the examples.

(Carbon Blacks)

ISAF ($N_2SA$=119 $m^2$/g, DBP absorption number=114 ml/100 g). "Seast 6" (trade name), manufactured by Tokai Carbon.

GPF ($N_2SA$=27 $m^2$/g, DBP absorption number=87 ml/100 g). "Seast V" (trade name), manufactured by Tokai Carbon.

MT ($N_2SA$=8 $m^2$/g, DBP absorption number=43 ml/100 g). "N990" (trade name), manufactured by Cancarb Thermax (Crosslinking Agent)

2,5-dimethyl-2,5-di(t-butylperoxy)hexane. "Perhexa 25B" (trade name), manufactured by NOF Corporation (Crosslinking Accelerator)

Triallyl isocyanurate (TAIC). "TAIC" (trade name), manufactured by Nippon Kasei Chemical Co., Ltd.

(Processing Aids)

Stearyl amine (Farmin 86T) (manufactured by Kao Corporation)

Stearic acid (manufactured by Kanto Kagaku)

(Acid Acceptor)

Zinc oxide (class A) (manufactured by Sakai Chemical Industry Co., Ltd.)

(Fluororubber A1)

44 L of pure water, 8.8 g of a 50% aqueous solution of $CH_2$=$CFCF_2OCF(CF_3)CF_2OCF(CF_3)COONH_4$ and 176 g of a 50% aqueous solution of $F(CF_2)_5COONH_4$ were placed in an 82 L stainless steel autoclave, which was then thoroughly purged with nitrogen gas. After increasing the temperature to 80° C. while stirring at 230 rpm, monomers were fed so that the initial monomer composition in the tank was VdF/HFP=50/50 (mol %) and the pressure was 1.52 MPa. Next, a polymerization initiator solution obtained by dissolving 1.0 g of APS in 220 mL of pure water was fed using nitrogen gas, thereby starting a reaction. At the point where the internal pressure dropped to 1.42 MPa due to the polymerization progressing, a monomer mixture comprising VdF/HFP (78/22 mol %) was fed as additional monomer until the internal pressure reached 1.52 MPa. At this point, 71 g of the diiodine compound $I(CF_2)_4I$ was fed. While repeatedly increasing and decreasing the pressure, an aqueous solution obtained by dissolving 1.0 g of APS in 220 mL of pure water was fed every 3 hours using nitrogen gas, thereby allowing the polymerization reaction to continue. At the point where 14,000 g of the monomer mixture had been added, unreacted monomer was discharged, the autoclave was cooled, and a fluororubber dispersion having a solid content concentration of 23.5 mass % was obtained. The copolymer composition of this fluororubber was investigated by means of NMR analysis, and found to have a VdF/HFP ratio of 78/22 (mol %) and a Mooney viscosity ($ML_{1+10}$ (100° C.)) of 62. This fluororubber was used as fluororubber A1.

Example 1

Using a mixer (TD35 100 MB (manufactured by Toshin), rotor diameter: 30 cm, chip clearance: 0.1 cm), 20 parts by mass of ISAF carbon black, 0.5 parts by mass of stearyl amine and 1 part by mass of zinc oxide were mixed with 100 parts by mass of fluororubber A1 at a front rotor speed of 40 rpm and a back rotor speed of 33 rpm, thereby obtaining a fluororubber precompound. The temperature of the mixed product discharged from the mixer was 175° C. This mixed product was cooled to a temperature of 100° C. or lower using a 16 inch open roll mixer adjusted to 25° C., mixed and then discharged. A fluororubber precompound B1 was obtained by ageing the resulting cooled and mixed product at 25° C. for 24 hours.

Next, using a mixer (TD35 100 MB (manufactured by Toshin), rotor diameter: 30 cm, chip clearance: 0.1 cm), fluororubber precompound B1 was mixed again at a front rotor speed of 40 rpm and a back rotor speed of 33 rpm. The temperature of the mixed product discharged from the mixer was 131° C. This mixed product was cooled to a temperature of 100° C. or lower using a 16 inch open roll mixer adjusted to 25° C., mixed and then discharged. A fluororubber precompound C1 was obtained by ageing the resulting cooled and mixed product at 25° C. for 24 hours.

Using a 22 inch open roll mixer (manufactured by Kansai Roll Co., Ltd., front roll speed: 12 rpm, back roll speed: 11 rpm, inter-roll gap: 0.2 cm, roll temperature: 25° C.), the fluororubber precompound C1 was tight milled in such a way that the maximum temperature was 76° C. Products obtained by tight milling 10 times and 50 times were used as fluororubber precompounds D1-1 and D1-2 respectively.

Measurement of quantity of solvent-insoluble polymer

The fluororubber precompound was formed into a sheet having a thickness of 2 mm, and a square test piece having sides of approximately 12 mm and weight of 0.5 g±0.01 g was cut out, and placed in a cubic SUS gauze cage having sides of 2 cm and an aperture size of 100 mesh. This gauze cage was suspended in an extraction vessel containing 150 mL of an extraction solvent, and left in the solvent for 160 hours at a prescribed extraction temperature (40° C.) so as to extract solvent-soluble components. A 200 mL shaking type autoclave (manufactured by Taiatsu Techno) was used as the extraction vessel, and a TBS 281HA water bath and an SRS 710 DA stirrer (both manufactured by Advantec Toyo) were used for heating. The gauze cage was lifted out of the extraction solvent, the extraction residue was recovered and vacuum dried for 3.5 hours at 110° C. so as to remove the solvent (vacuum dryer: DP 33, manufactured by Yamato Scientific Co., Ltd., aspirator: WP 15, manufactured by Yamato Scientific Co., Ltd.), and the dry weight following extraction was measured. The quantity of solvent-insoluble polymer was calculated using the expression below. The quantity of solvent-insoluble polymer in the fluororubber precompounds C1, D1-1 and D1-2 was 44.6%, 53.2% and 52.6% respectively.

$$\text{Quantity of solvent-insoluble polymer (\%)} = \frac{w' \times \Phi'_p}{w \times \Phi_p} \times 100 \quad \text{[Expression 3]}$$

(In the expression, w is the initial weight (g) of the fluororubber composition which is immersed in the extraction solvent, w' is the dry weight (g) of the extraction residue, $\Phi_p$ is the initial weight fraction of the fluororubber (A) contained in the fluororubber composition which is immersed in the extraction solvent relative to the fluororubber composition, and $\Phi_p'$ is the weight fraction of the fluororubber (A) contained in the extraction residue relative to the extraction residue)

Using a 22 inch open roll mixer (manufactured by Kansai Roll Co., Ltd.), 1.0 part by mass of a crosslinking agent, 0.5 parts by mass of a crosslinking accelerator (TAIC) and 1.0 part by mass of stearic acid were mixed for 60 minutes with 121.5 parts by mass of fluororubber precompound D1-1 or D1-2 at a front roll speed of 12 rpm, a back roll speed of 11 rpm, an inter-roll gap of 0.4 cm and a roll temperature of 25° C., thereby obtaining fluororubber full compounds E1-1 and E1-2. Moreover, the maximum temperature of the mixed products discharged from the open roll mixer was 100° C. The thus obtained two fluororubber full compounds were crosslinked by being pressed at 160° C. for 30 minutes, thereby obtaining two sheet-like crosslinked articles having thicknesses of 2 mm.

Test pieces (JIS No. 6 dumbbells) were prepared from these sheets, and these test pieces were measured for tensile strength at break and tensile elongation at break at 25° C. and 160° C. and also subjected to a tensile fatigue test at 150° C. The results are shown in the table 1.

TABLE 1

| Mechanical properties of crosslinked article | E1-1 | E1-2 |
|---|---|---|
| Measurement temperature 25° C. | | |
| Tensile strength at break (MPa) | 22.8 | 22 |
| Tensile elongation at break (%) | 728 | 756 |
| Measurement temperature 160° C. | | |
| Tensile strength at break (MPa) | 4.6 | 3.3 |
| Tensile elongation at break (%) | 485 | 463 |
| Repeated test at high temperature (150° C.) | | |
| The number of cycles until breaking | 2625 | No breaking even at 10000 |

Example 2

Using a mixer (TD35 100 MB (manufactured by Toshin), rotor diameter: 30 cm, chip clearance: 0.1 cm), 15 parts by mass of ISAF carbon black, 0.5 parts by mass of stearyl amine and 1 part by mass of zinc oxide were mixed with 100 parts by mass of fluororubber A1 at a front rotor speed of 40 rpm and a back rotor speed of 33 rpm, thereby obtaining a fluororubber precompound. The temperature of the mixed product discharged from the mixer was 165° C. This mixed product was cooled to a temperature of 100° C. or lower using a 16 inch open roll mixer adjusted to 25° C., mixed and then discharged. A fluororubber precompound B2 was obtained by ageing the resulting cooled and mixed product at 25° C. for 24 hours.

Using a 22 inch open roll mixer (manufactured by Kansai Roll Co., Ltd., front roll speed: 12 rpm, back roll speed: 11 rpm, inter-roll gap: 0.2 cm, roll temperature: 25° C.), the fluororubber precompound B2 was then tight milled in such a way that the maximum temperature was 71° C. A product obtained by tight milling 10 times was used as fluororubber precompound D2.

When the thus obtained fluororubber precompound D2 was measured for the quantity of solvent-insoluble polymer in the same way as in Example 1, this quantity was 52.5%.

Using a 22 inch open roll mixer (manufactured by Kansai Roll Co., Ltd.), 1.0 part by mass of a crosslinking agent, 0.5 parts by mass of a crosslinking accelerator (TAIC) and 1.0 part by mass of stearic acid were mixed for 60 minutes with 116.5 parts by mass of fluororubber precompound at a front roll speed of 12 rpm, a back roll speed of 11 rpm, an inter-roll gap of 0.4 cm and a roll temperature of 25° C., thereby obtaining fluororubber full compound E2. Moreover, the maximum temperature of the mixed product discharged from the open roll mixer was 97° C. The thus obtained fluororubber full compound was crosslinked by being pressed at 160° C. for 30 minutes, thereby obtaining a sheet-like crosslinked article having a thickness of 2 mm. A test piece (JIS No. 6 dumbbell) was prepared from this sheet, and this test piece was measured for tensile strength at break and tensile elongation at break at 25° C. and 160° C. and also subjected to a tensile fatigue test at 150° C. The results are shown in the table 2.

TABLE 2

| Mechanical properties of crosslinked article | E2 |
|---|---|
| Measurement temperature 25° C. | |
| Tensile strength at break (MPa) | 21.9 |
| Tensile elongation at break (%) | 753 |

TABLE 2-continued

| Mechanical properties of crosslinked article | E2 |
|---|---|
| Measurement temperature 160° C. | |
| Tensile strength at break (MPa) | 2.96 |
| Tensile elongation at break (%) | 364 |
| Repeated test at high temperature (150° C.) | |
| The number of cycles until breaking | 2096 |

Example 3

Preparation of Fluororubber Precompound

Using a mixer (TD35 100 MB (manufactured by Toshin), rotor diameter: 30 cm, chip clearance: 0.1 cm), 35 parts by mass of ISAF carbon black, 0.5 parts by mass of stearyl amine and 1 part by mass of zinc oxide were mixed with 100 parts by mass of fluororubber A1 at a front rotor speed of 40 rpm and a back rotor speed of 33 rpm, thereby obtaining a fluororubber precompound. The temperature of the mixed product discharged from the mixer was 175° C. This mixed product was cooled to a temperature of 100° C. or lower using a 16 inch open roll mixer adjusted to 25° C., mixed and then discharged. A fluororubber precompound B3 was obtained by ageing the resulting cooled and mixed product at 25° C. for 24 hours.

Using a 22 inch open roll mixer (manufactured by Kansai Roll Co., Ltd., front roll speed: 12 rpm, back roll speed: 11 rpm, inter-roll gap: 0.2 cm, roll temperature: 25° C.), the fluororubber precompound B3 was then tight milled in such a way that the maximum temperature was 74° C. A product obtained by tight milling 10 times was used as fluororubber precompound D3.

When the thus obtained fluororubber precompound D3 was measured for the quantity of solvent-insoluble polymer in the same way as in Example 1, this quantity was 42.0%.

Using a 22 inch open roll mixer (manufactured by Kansai Roll Co., Ltd.), 1.0 part by mass of a crosslinking agent, 0.5 parts by mass of a crosslinking accelerator (TAIC) and 1.0 part by mass of stearic acid were mixed for 60 minutes with 136.5 parts by mass of fluororubber precompound at a front roll speed of 12 rpm, a back roll speed of 11 rpm, an inter-roll gap of 0.4 cm and a roll temperature of 25° C., thereby obtaining fluororubber full compound E3. Moreover, the maximum temperature of the mixed product discharged from the open roll mixer was 110° C. The thus obtained fluororubber full compound was crosslinked by being pressed at 160° C. for 30 minutes, thereby obtaining a sheet-like crosslinked article having a thickness of 2 mm. A test piece (JIS No. 6 dumbbell) was prepared from this sheet, and this test piece was measured for tensile strength at break and tensile elongation at break at 25° C. and 160° C. and also subjected to a tensile fatigue test at 150° C. The results are shown in the table 3.

TABLE 3

| Mechanical properties of crosslinked article | E3 |
|---|---|
| Measurement temperature 25° C. | |
| Tensile strength at break (MPa) | 16.7 |
| Tensile elongation at break (%) | 555 |
| Measurement temperature 160° C. | |
| Tensile strength at break (MPa) | 5.2 |
| Tensile elongation at break (%) | 352 |

TABLE 3-continued

| Mechanical properties of crosslinked article | E3 |
|---|---|
| Repeated test at high temperature (150° C.) | |
| The number of cycles until breaking | 1576 |

Example 4

Preparation of Fluororubber Precompound

Using a mixer (TD35 100 MB (manufactured by Toshin), rotor diameter: 30 cm, chip clearance: 0.1 cm), 20 parts by mass of GPF carbon black, 0.5 parts by mass of stearyl amine and 1 part by mass of zinc oxide were mixed with 100 parts by mass of fluororubber A1 at a front rotor speed of 40 rpm and a back rotor speed of 33 rpm, thereby obtaining a fluororubber precompound. The temperature of the mixed product discharged from the mixer was 156° C. This mixed product was cooled to a temperature of 100° C. or lower using a 16 inch open roll mixer adjusted to 25° C., mixed and then discharged. A fluororubber precompound B4 was obtained by ageing the resulting cooled and mixed product at 25° C. for 24 hours.

Using a 22 inch open roll mixer (manufactured by Kansai Roll Co., Ltd., front roll speed: 12 rpm, back roll speed: 11 rpm, inter-roll gap: 0.2 cm, roll temperature: 25° C.), the fluororubber precompound B4 was then tight milled in such a way that the maximum temperature was 65° C. A product obtained by tight milling 10 times was used as fluororubber precompound D4.

When the thus obtained fluororubber precompound D4 was measured for the quantity of solvent-insoluble polymer in the same way as in Example 1, this quantity was 8.0%.

Using a 22 inch open roll mixer (manufactured by Kansai Roll Co., Ltd.), 1.0 part by mass of a crosslinking agent, 0.5 parts by mass of a crosslinking accelerator (TAIC) and 1.0 part by mass of stearic acid were mixed for 60 minutes with 121.5 parts by mass of fluororubber precompound at a front roll speed of 12 rpm, a back roll speed of 11 rpm, an inter-roll gap of 0.4 cm and a roll temperature of 25° C., thereby obtaining fluororubber full compound E4. Moreover, the maximum temperature of the mixed product discharged from the open roll mixer was 96° C. The thus obtained fluororubber full compound was crosslinked by being pressed at 160° C. for 30 minutes, thereby obtaining a sheet-like crosslinked article having a thickness of 2 mm. A test piece (JIS No. 6 dumbbell) was prepared from this sheet, and this test piece was measured for tensile strength at break and tensile elongation at break at 25° C. and 160° C. and also subjected to a tensile fatigue test at 150° C. The results are shown in the table 4.

TABLE 4

| Mechanical properties of crosslinked article | E4 |
|---|---|
| Measurement temperature 25° C. | |
| Tensile strength at break (MPa) | 12.2 |
| Tensile elongation at break (%) | 740 |
| Measurement temperature 160° C. | |
| Tensile strength at break (MPa) | 2.2 |
| Tensile elongation at break (%) | 246 |
| Repeated test at high temperature (150° C.) | |
| The number of cycles until breaking | 630 |

Comparative Example 1

Preparation of Fluororubber Precompound

Using a mixer (TD35 100 MB (manufactured by Toshin), rotor diameter: 30 cm, chip clearance: 0.1 cm), 20 parts by mass of MT carbon black, 0.5 parts by mass of stearyl amine and 1 part by mass of zinc oxide were mixed with 100 parts by mass of fluororubber A1 at a front rotor speed of 40 rpm and a back rotor speed of 33 rpm, thereby obtaining a fluororubber precompound. The temperature of the mixed product discharged from the mixer was 141° C. This mixed product was cooled to a temperature of 100° C. or lower using a 16 inch open roll mixer adjusted to 25° C., mixed and then discharged. A fluororubber precompound B5 was obtained by ageing the resulting cooled and mixed product at 25° C. for 24 hours.

Using a 22 inch open roll mixer (manufactured by Kansai Roll Co., Ltd., front roll speed: 12 rpm, back roll speed: 11 rpm, inter-roll gap: 0.2 cm, roll temperature: 25° C.), the fluororubber precompound B5 was then tight milled in such a way that the maximum temperature was 61° C. A product obtained by tight milling 10 times was used as fluororubber precompound D5.

When the thus obtained fluororubber precompound D5 was measured for the quantity of solvent-insoluble polymer in the same way as in Example 1, this quantity was 0.0%.

Using a 22 inch open roll mixer (manufactured by Kansai Roll Co., Ltd.), 1.0 part by mass of a crosslinking agent, 0.5 parts by mass of a crosslinking accelerator (TAIC) and 1.0 part by mass of stearic acid were mixed for 60 minutes with 121.5 parts by mass of fluororubber precompound at a front roll speed of 12 rpm, a back roll speed of 11 rpm, an inter-roll gap of 0.4 cm and a roll temperature of 25° C., thereby obtaining fluororubber full compound E5. Moreover, the maximum temperature of the mixed product discharged from the open roll mixer was 96° C. The thus obtained fluororubber full compound was crosslinked by being pressed at 160° C. for 30 minutes, thereby obtaining a sheet-like crosslinked article having a thickness of 2 mm. A test piece (JIS No. 6 dumbbell) was prepared from this sheet, and this test piece was measured for tensile strength at break and tensile elongation at break at 25° C. and 160° C. and also subjected to a tensile fatigue test at 150° C. The results are shown in the table 5.

TABLE 5

| Mechanical properties of crosslinked article | E5 |
|---|---|
| Measurement temperature 25° C. | |
| Tensile strength at break (MPa) | 9.8 |
| Tensile elongation at break (%) | 870 |
| Measurement temperature 160° C. | |
| Tensile strength at break (MPa) | 1.1 |
| Tensile elongation at break (%) | 120 |
| Repeated test at high temperature (150° C.) | |
| The number of cycles until breaking | 15 |

(Fluororubber A6)

1.7 L of pure water, 0.17 g of a 50% aqueous solution of $CH_2=CFCF_2OCF(CF_3)CF_2OCF(CF_3)COONH_4$ and 6.8 g of a 50% aqueous solution of $F(CF_2)_5COONH_4$ were placed in an 3 L stainless steel autoclave, which was then thoroughly purged with nitrogen gas. After increasing the temperature to 80° C. while stirring at 600 rpm, monomers were fed so that the initial monomer composition in the tank was VdF/HFP=45/55 (mol %) and the pressure was 1.52 MPa. Next, a polymerization initiator solution obtained by dissolving 60 mg of APS in 5 mL of pure water was fed using nitrogen gas, thereby starting a reaction. At the point where the internal pressure dropped to 1.42 MPa due to the polymerization progressing, a monomer mixture comprising VdF/HFP (78/22 mol %) was fed as additional monomer until the internal pressure reached 1.52 MPa. At this point, 1.96 g of the diiodine compound $I(CF_2)_4I$ was fed. While repeatedly increasing and decreasing the pressure, an aqueous solution obtained by dissolving 60 mg of APS in 5 mL of pure water was fed every 3 hours using nitrogen gas, thereby allowing the polymerization reaction to continue. At the point where 600 g of the monomer mixture had been added, unreacted monomer was discharged, the autoclave was cooled, and 610 g of a fluororubber dispersion having a solid content concentration of 26.1 mass % was obtained. The polymerization time was 7.1 hours. The copolymer composition of this fluororubber was investigated by means of NMR analysis, and found to have a VdF/HFP ratio of 78/22 (mol %) and a Mooney viscosity ($ML_{1+10}$ (100° C.)) of 77. This fluororubber was used as fluororubber A6.

Experimental Example 5

Experimental Example 5 is an example in which step (1-1) and step (1-2) are carried out and step (2-1) is carried out, and an example in which step (2-2) is carried out after step (2-1).

Using a mixer (Mix Labo 0.5 L (manufactured by Moriyama), rotor diameter: 6.6 cm, chip clearance: 0.05 cm), 20 parts by mass of ISAF carbon black, 0.5 parts by mass of stearyl amine and 1.0 part by mass of zinc oxide were mixed with 100 parts by mass of fluororubber (A6) at a front rotor speed of 60 rpm and a back rotor speed of 50 rpm. The temperature of the mixed product discharged from the mixer was 165° C. This mixed product was cooled to a temperature of 100° C. or lower using an 8 inch open roll mixer adjusted to 25° C., mixed and then discharged. A fluororubber precompound B6 was obtained by ageing the resulting cooled and mixed product at 25° C. for 24 hours. The fluororubber precompound B6 had a shear modulus (G'(1%)) of 866 kPa and a ratio (G'(1%)/G'(100%)) of the shear modulus (G'(1%)) to the shear modulus (G'(100%)) of 4.9.

Next, using a mixer (Mix Labo 0.5 L (manufactured by Moriyama), rotor diameter: 6.6 cm, chip clearance: 0.05 cm), fluororubber precompound B6 was mixed again at a front rotor speed of 60 rpm and a back rotor speed of 50 rpm. The temperature of the mixed product discharged from the mixer was 131° C. This mixed product was cooled to a temperature of 100° C. or lower using an 8 inch open roll mixer adjusted to 25° C., mixed and then discharged. A fluororubber precompound C6 (the intermediate composition in the production method of the present invention) was obtained by ageing the resulting cooled and mixed product at 25° C. for 24 hours. The fluororubber precompound C6 had a shear modulus (G'(1%)) of 795 kPa and a ratio (G'(1%)/G'(100%)) of the shear modulus (G'(1%)) to the shear modulus (G'(100%)) of 4.5.

Using an 8 inch open roll mixer (roll temperature: 25° C., front roll speed: 21 rpm, back roll speed: 19 rpm, inter-roll gap: 0.05 cm), the fluororubber precompound C6 was tight milled in such a way that the maximum temperature was 25 to 70° C.

A product obtained by tight milling once was used as fluororubber precompound D6, and a product obtained by tight milling 10 times (that is, m=10) was used as fluororubber precompound D7.

The fluororubber precompound D6 had a shear modulus (G'(1%)) of 690 kPa and a ratio (G'(1%)/G' (100%)) of the shear modulus (G'(1%)) to the shear modulus (G'(100%)) of 4.1. The value obtained by dividing the (G'(1%)/G' (100%)) value of fluororubber precompound D6 by the (G'(1%)/G' (100%)) value of fluororubber precompound C6 was 0.92.

The fluororubber precompound D7 had a shear modulus (G'(1%)) of 631 kPa and a ratio (G'(1%)/G' (100%)) of the shear modulus (G'(1%)) to the shear modulus of 3.9. The value obtained by dividing the (G'(1%)/G' (100%)) value of fluororubber precompound D7 by the (G'(1%)/G' (100%)) value of fluororubber precompound C6 was 0.87.

Using an 8 inch open roll mixer (manufactured by Kansai Roll Co., Ltd.), 1.0 part by mass of a crosslinking agent, 0.5 parts by mass of a crosslinking accelerator and 1.0 part by mass of stearic acid were mixed for 15 minutes with 121.5 parts by mass of a fluororubber precompound (C6 and D7) at a roll temperature of 25° C., a front roll speed of 21 rpm, a back roll speed of 19 rpm and an inter-roll gap of 0.1 cm, thereby obtaining fluororubber full compounds (E6 and E7). The temperature of the mixed products discharged from the open roll mixer was 70 to 73° C.

The fluororubber full compounds (E6 and E7) were crosslinked by being pressed at 160° C. for 30 minutes, thereby obtaining sheet-like test pieces having thicknesses of 2 mm. Test pieces (JIS No. 6 dumbbells) were prepared from these sheets, and the number of cycles until the test pieces broke was counted. The results are shown in Table 6.

TABLE 6

|  | E6 | E7 |
|---|---|---|
| Composition of full precompound (part by mass) | | |
| Precompound C6 | 121.5 | |
| Precompound D7 | | 121.5 |
| TAIC | 0.5 | 0.5 |
| Crosslinking agent | 1.00 | 1.00 |
| Stearic acid | 1.0 | 1.0 |
| Conditions of cross-linking by pressing | 160° C., 30 min | 160° C., 30 min |
| Mechanical properties of crosslinked article Measurement temperature 25° C. | | |
| Tensile strength at break (MPa) | 21.1 | 22.8 |
| Tensile elongation at break (%) | 703 | 728 |
| Measurement temperature 160° C. | | |
| Tensile strength at break (MPa) | 4.4 | 4.6 |
| Tensile elongation at break (%) | 450 | 485 |
| Repeated test at high temperature (150° C.) | | |
| The number of cycles until breaking | 4550 | 11000 or more |

As shown in Table 6, a crosslinked fluororubber article having excellent mechanical properties at high temperatures was obtained from fluororubber precompound D7, which was obtained by tight milling using an open roll.

Reference Examples

Using an 8 inch open roll mixer (manufactured by Kansai Roll Co., Ltd.), 1.0 part by mass of a crosslinking agent, 0.5 parts by mass of a crosslinking accelerator and 0.5 parts by mass of stearyl amine were mixed for 15 minutes with 121.5 parts by mass of the fluororubber precompounds obtained in Experimental Example 5 (B6, C6, D6 and D7) at a roll temperature of 25° C., a front roll speed of 21 rpm, a back roll speed of 19 rpm and an inter-roll gap of 0.1 cm, thereby obtaining four fluororubber full compounds. The temperature of the mixed products discharged from the open roll mixer was 70 to 73° C.

The fluororubber full compounds were crosslinked by being pressed at 160° C. for 30 minutes, thereby obtaining sheet-like test pieces having thicknesses of 2 mm.

The thus obtained sheet-like test pieces were immersed for 200 hours in a solution comprising 95 vol % of water and 5 vol % of diethanolamine at 90° C. Surprisingly, the sheet-like test pieces obtained by cross-linking B6, C6, D6 and D7 exhibited a volume increase of 5% or lower, whereas a sheet-like test piece obtained by mixing 20 parts by mass of MT carbon black, 4 parts by mass of a cross-linking accelerator (TAIC) and 1.5 parts by mass of a (peroxide) cross-linking agent with 100 parts by mass of fluororubber (A6) using an 8 inch open roll controlled at 25° C. and then cross-linking by pressing for 30 minutes at 160° C. exhibited a volume increase of 100% under the same conditions.

REFERENCE SIGNS LIST

10: Open roll
11: First roll
12: Second roll
13: Intermediate composition
14: Composition following tight milling

The invention claimed is:

1. A fluororubber composition comprising: a fluororubber (A); and carbon black (B); and a crosslinking agent (C) and/or a crosslinking accelerator (D), wherein
when the fluororubber composition in an uncrosslinked state is immersed for 160 hours in an extraction solvent of acetone and hexane at an acetone:hexane mass ratio of 42.29:57.71 at 40° C. and extraction residue that is not extracted and remains as a solid is separated from the aforementioned extraction solvent and dried and then the dry weight of the extraction residue is measured, the quantity of a solvent-insoluble polymer, as calculated using the expression below, is not lower than 5%:

$$\text{Quantity of solvent-insoluble polymer (\%)} = \frac{w' \times \Phi'_p}{w \times \Phi_p} \times 100 \qquad \text{[Expression 1]}$$

(where, $w$ is an initial weight (g) of the fluororubber composition which is immersed in the extraction solvent, $w'$ is a dry weight (g) of the extraction residue, $\phi_p$ is an initial weight fraction of the fluororubber (A) contained in the fluororubber composition which is immersed in the extraction solvent relative to the fluororubber composition, and $\phi_p'$ is a weight fraction of the fluororubber (A) contained in the extraction residue relative to the extraction residue).

2. The fluororubber composition according to claim 1, wherein the fluororubber (A) is a vinylidene fluoride rubber.

3. The fluororubber composition according to claim 1, wherein the fluororubber (A) is a bipolymer selected from among the group consisting of a copolymer of vinylidene fluoride and hexafluoropropylene, a copolymer of vinylidene fluoride and a fluorine-containing monomer represented by general formula (2) and a copolymer of vinylidene fluoride and a perfluoro (alkyl vinyl ether):

Here, general formula (2) being

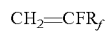  (2)

(where, Rf is a straight chain or branched fluoroalkyl group having 1 to 12 carbon atoms).

4. The fluororubber composition according to claim 1, which contains 5 to 65 parts by mass of the carbon black (B) relative to 100 parts by mass of the fluororubber (A).

5. The fluororubber composition according to claim 1, wherein the carbon black (B) has a nitrogen adsorption specific surface area ($N_2SA$) of 25 to 180 $m^2/g$ and a dibutyl phthalate (DBP) absorption number of 45 to 180 ml/100 g.

6. A method for producing a fluororubber composition, the method comprising:
   a step (1-1) of mixing the fluororubber (A) and the carbon black (B) by means of an internal mixer until the maximum temperature reaches 80 to 220° C. so as to obtain an intermediate composition;
   a step (1-2) of cooling the intermediate composition to a temperature of lower than 50° C.; and
   a step (2-1) of mixing the cooled intermediate composition until the maximum temperature reaches not lower than 10° C. but lower than 80° C. so as to obtain a fluororubber composition.

7. The method for producing a fluororubber composition according to claim 6, wherein the fluororubber (A) is a vinylidene fluoride rubber.

8. The method for producing a fluororubber composition according to claim 6, wherein 5 to 65 parts by mass of the carbon black (B) is mixed with 100 parts by mass of the fluororubber (A) in the step (1-1).

9. The method for producing a fluororubber composition according to claim 6, wherein the carbon black (B) has a nitrogen adsorption specific surface area ($N_2SA$) of 25 to 180 $m^2/g$ and a dibutyl phthalate (DBP) absorption number of 45 to 180 ml/100 g.

10. The method for producing a fluororubber composition according to claim 6, wherein a crosslinking agent (C) and/or a crosslinking accelerator (D) is further mixed in the step (1-1).

11. The method for producing a fluororubber composition according to claim 6, further comprising a step of mixing a crosslinking agent (C) and/or a crosslinking accelerator (D) with the fluororubber composition obtained in the step (2-1).

12. The fluororubber composition according to claim 1, wherein the fluororubber composition comprises the crosslinking agent (C), the crosslinking agent (C) being a crosslinking agent for a peroxide crosslinking system.

13. The fluororubber composition according to claim 1, wherein the fluororubber composition comprises the crosslinking agent (C), the crosslinking agent (C) being a crosslinking agent for a peroxide crosslinking system which generates peroxy radicals in the presence of heat or an oxidation-reduction system.

* * * * *